United States Patent
Elazary et al.

(10) Patent No.: US 10,949,800 B2
(45) Date of Patent: Mar. 16, 2021

(54) PARTITIONING AND COALESCING OPERATION OF ROBOTS FOR COORDINATED AUTONOMOUS EXECUTION

(71) Applicant: inVia Robotics, Inc., Westlake Village, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 178 days.

(21) Appl. No.: 16/230,840

(22) Filed: Dec. 21, 2018

(65) Prior Publication Data

US 2020/0202285 A1 Jun. 25, 2020

(51) Int. Cl.
| | |
|---|---|
| *G06Q 10/00* | (2012.01) |
| *G06Q 10/08* | (2012.01) |
| *B65G 1/137* | (2006.01) |
| *G06F 9/48* | (2006.01) |
| *G05D 1/02* | (2020.01) |

(52) U.S. Cl.
CPC ......... *G06Q 10/087* (2013.01); *B65G 1/1373* (2013.01); *G05D 1/0287* (2013.01); *G06F 9/4806* (2013.01); *G05D 2201/0216* (2013.01)

(58) Field of Classification Search
CPC ... G06Q 10/087; G05D 1/0287; G06F 9/4806
USPC ..................................................... 705/16, 28
See application file for complete search history.

(56) References Cited

U.S. PATENT DOCUMENTS

| | | | |
|---|---|---|---|
| 2016/0107838 A1* | 4/2016 | Swinkels ............ | B65G 1/0492 414/273 |
| 2016/0176638 A1* | 6/2016 | Toebes ................ | B65G 1/0492 700/216 |
| 2018/0229367 A1* | 8/2018 | Lee ........................ | G06F 9/545 |

* cited by examiner

*Primary Examiner* — Rokib Masud
(74) *Attorney, Agent, or Firm* — Ansari Katiraei LLP; Arman Katiraei; Sadiq Ansari

(57) ABSTRACT

Robots and/or a robot coordinator are provided to execute an overall task by partitioning the task into subtasks and by coalescing results and/or output of the subtasks. The robot coordinator may coordinate, control, and/or program a set of robots to operate within different sections of a site and to execute subtasks associated with different tasks that fall within their respective sections in parallel. The robot coordinator may coordinate, control, and/or program the same or different set of robots to coalesce results and/or output for subtasks for a particular task from the different sections to complete the overall task. For instance, a first set of robots may retrieve objects that are stored at storage locations within the sections in which each robot operates, and a second set of robots may rotate moveable storage apparatus across the sections so that each storage apparatus stores all objects of a particular order.

14 Claims, 18 Drawing Sheets

PARTITIONING AND COALESCING OPERATION OF ROBOTS FOR COORDINATED AUTONOMOUS EXECUTION

TECHNICAL FIELD

The present invention relates to the technical field of robotics.

BACKGROUND INFORMATION

Robots may be used to reduce costs in many industries and sectors by automating various manually performed tasks. Robots are especially effective at performing repeat mundane tasks.

Warehouse management and/or inventory management can greatly benefit from automation. Warehouse management and/or inventory management may include repeated tasks such as object retrieval for order fulfillment.

Automating one or more of these tasks may require special purpose robots that have the functionality to perform the tasks, and that are also programmed to perform the tasks. Automating these and other tasks, via robotic execution of the tasks, may lead to lower error rates, higher throughout via continuous operation of the robots, and lower operating costs.

DETAILED DESCRIPTION OF PREFERRED EMBODIMENTS

I. Overview

Figure 1:
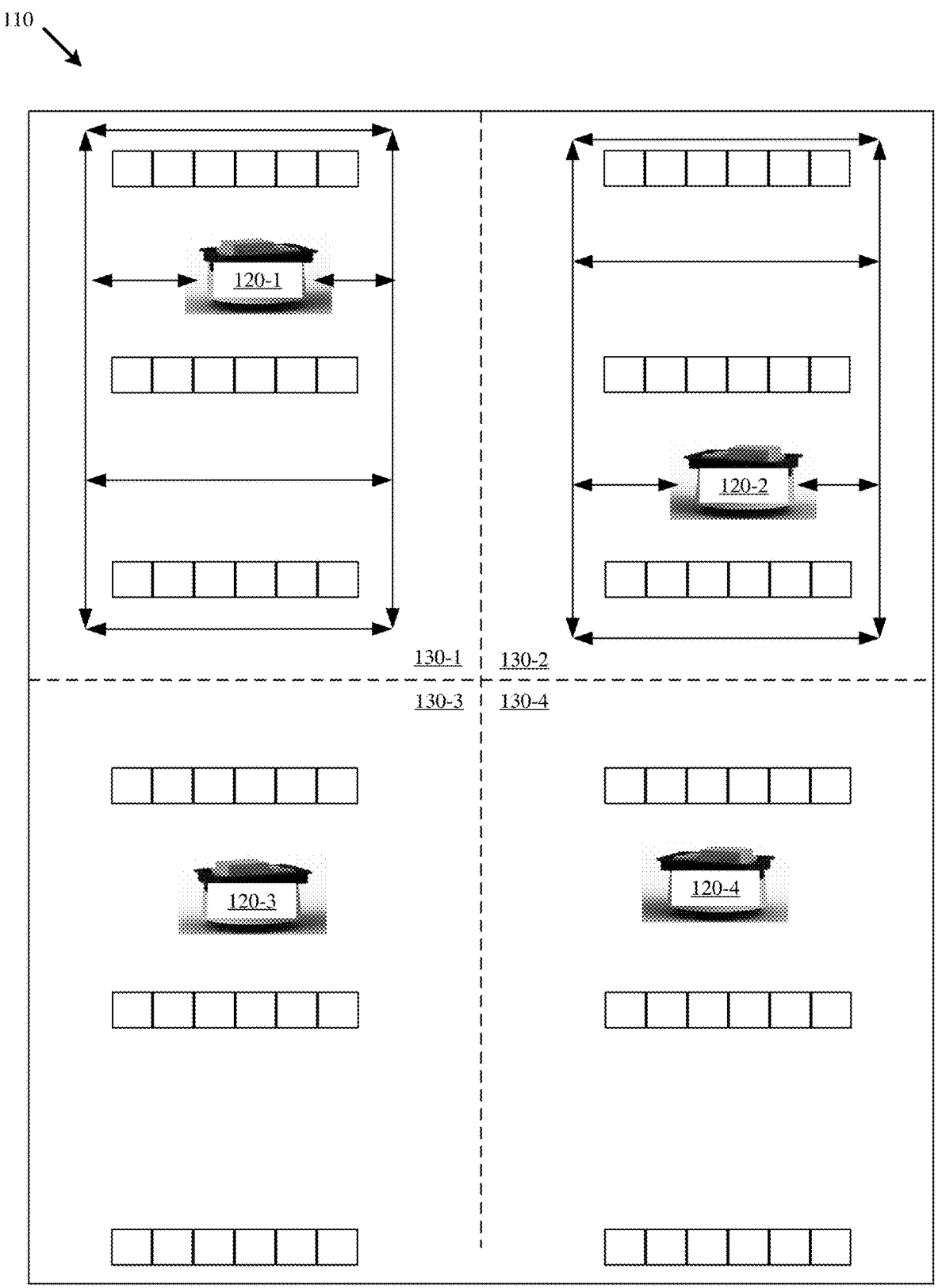
FIG. 1 conceptually illustrates an example of the partitioned robotic operation in accordance with some embodiments set forth herein.

The following detailed description refers to the accompanying drawings. The same reference numbers in different drawings may identify the same or similar elements.

Systems and/or methods, as described herein, partition and coalesce operations of one or more sets of robots for coordinated autonomous execution of a set tasks by the robots. The partitioned and coalesced operation may include partitioning an overall task into subtasks that different robots can execute without conflict, and coalescing the results and/or output of the subtasks in order to complete the overall tasks.

In some embodiments, the partitioned operation of a set of robots may include coordinating, controlling, and/or programming the set of robots into different subsets of one or more robots that exclusively operate in different physical regions, spaces, and/or sections of a common site. Each subset of robots may complete different subtasks of an overall task within their respective regions without resource and/or other conflict with the subsets of robots operating in the other regions or spaces. In some embodiments, the assignment of subtasks to the different subsets of robots may be used to restrict robot operation to a particular region, space, and/or section.

In some embodiments, the coalescing operations may include coordinating, controlling, programming, and/or using the subsets of robots or another set of robots to combine the results and/or output from the different subtasks executed by the subsets of robots operating in the different regions. The coalescing robots may perform different coalescing operations and/or may coordinate their coalescing operations with the subset of robots operating in the different regions to maximize the task completion rate.

The coordinated autonomous execution of tasks by the robots according to the partitioned and coalesced operation provides several advantages over an uncoordinated and independent operation of robots. For instance, the partitioned and coalesced operation may reduce the amount of time that each robot spends and the total distance that each robot traverses in order to complete a task by coordinating and/or controlling the robots to operate in specific regions rather than generally use any robot to perform any task anywhere in a larger site.

Another advantage of the partitioned and coalesced operation is to reduce the collisions and obstacle avoidance performed by the robots. Partitioning the operation of robots to different regions eliminates the possibility of the robots crossing paths, queuing behind one another, deadlocking, and/or otherwise restricting movements of other robots.

By reducing the total distance that each robot may travel in order to complete a task, and by reducing conflicts between robots, the partitioned and coalesced operation for coordinated autonomous execution of tasks set forth herein allows the robots to operate with greater efficiency. The greater efficiency allows the same number of robots to complete more tasks in the same amount of time, thereby providing savings in time and money to the site operator.

II. Partitioned Operation of Robots

The systems and methods for the coordinated robotic operation are based in part on partitioning the operation of a set of robots to different regions or sections of a site. The site may represent a warehouse or other space in which two or more robots collaboratively operate to complete one or more tasks.

FIG. 1 conceptually illustrates an example of the partitioned robotic operation in accordance with some embodiments set forth herein. FIG. 1 illustrates example site 110 and four robots 120-1, 120-2, 120-3, and 120-4 (herein sometimes collectively referred to as "robots 120" or individually as "robot 120") that operate within site 110. Site 110 may be logically partitioned into four sections 130-1, 130-2, 130-3, and 130-4 (herein sometimes collectively referred to as "sections 130" or individually as "section 130").

The logical partitioning of site 110 may result from coordinating the operation of robots 120 so that each robot 120 performs tasks in a different section 130. For example, robot 120-1 may be assigned and/or perform tasks that are exclusively within section 130-1, and robot 120-2 may be assigned and/or perform tasks that are exclusively within section 130-2, thereby eliminating or minimizing the possibility that robot 120-1 operates in any section 130 other than section 130-1, or the possibility that robot 120-2 operates in any section 130 other than section 130-2. As another example, a customer order may include objects that are stored in section 130-1 and section 130-2. Accordingly, robot 120-1, operating in section 130-1, may retrieve the ordered objects from storage shelves that are in section 130-1, and robot 120-2, operating in the section 130-2, may retrieve the ordered objects from the storage shelves that are in section 130-2. In this example, robots 120-1 and 120-2 do not intersect or collide since they exclusively operate in different sections 130-1 and 130-2.

In some embodiments, a robot coordinator coordinates and/or controls the operations of robots 120. The robot coordinator may be a centralized system or a distributed system that is communicatively coupled to robots 120 via one or more wireless networks. In some embodiments, each robot 120 may execute and/or provide part of the robot coordinator's functionality.

The robot coordinator may coordinate and/or control the partitioned operation of robots 120 to sections 130. More specifically, the robot coordinator may produce the logical partitioning of site 110 into sections 130 by directing robots 120 to operate in different sections 130. For instance, the robot coordinator may receive one or more tasks that are to be completed by robots 120. Prior to assigning the tasks to robots 120 for execution, the robot coordinator may determine a location and/or resources for execution of each task in site 110, and may map the location and/or resources to partitioned sections 130 within site 110. The robot coordinator may then assign the tasks to robots 120 that operate in sections 130 where the task locations and/or resources are located. The resources for a particular task may include one or more storage locations, access points, physical space, and/or objects that may be used and/or accessed by robot 120 in completion of the particular task.

Figure 2:
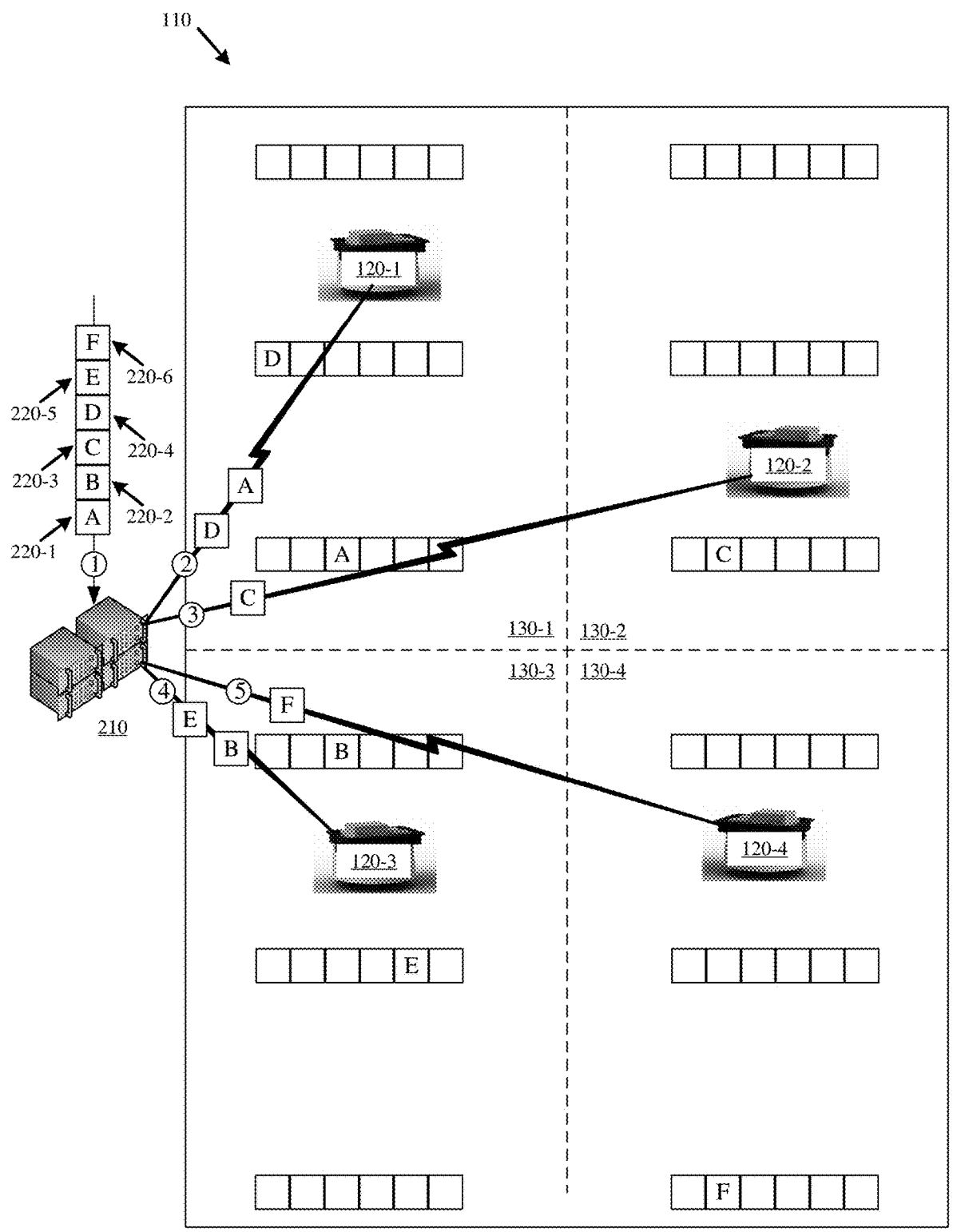
FIG. 2 illustrates an example of a robot coordinator partitioning the operation of robots into different sections via task assignment in accordance with some embodiments described herein.

FIG. 2 illustrates an example of robot coordinator 210 partitioning the operation of robots 120 into sections 130 via task assignment in accordance with some embodiments described herein. In FIG. 2, robot coordinator 210 may receive (at 1) six tasks 220-1, 220-2, 220-3, 220-4, 220-5, and 220-6 (herein sometimes collectively referred to as "tasks 220" or individually as "task 220"). Robot coordinator 210 may map each of the six tasks 220 to one of four partitioned sections 130. In FIG. 2, tasks 220 may represent different objects of a particular customer order. Robot coordinator 210 may identify where each object, corresponding to a task 220, is stored in site 110, and may determine which section 130 the storage location of the identified object is in. Robot coordinator 210 may assign tasks 220 that are mapped to a particular section 130 to the robot that is designated to operate in that particular section 130.

As shown in FIG. 2, robot coordinator 210 assigns (at 2) first and fourth received tasks 220-1 and 220-4 to robot 120-1 operating in section 130-1 where the objects for first and fourth tasks 220-1 and 220-4 are stored, assigns (at 3) third received task 220-3 to robot 120-2 operating in section 130-2 where the object for second task 220-3 is stored, assigns (at 4) second and fifth tasks 220-2 and 220-5 to robot 120-3 operating in section 130-3 where the objects for second and fifth tasks 220-2 and 220-5 are stored, and assigns (at 5) sixth task 220-6 to fourth robot 120-4 operating in section 130-4 where the object for sixth task 220-4 is stored.

Based on the assignment of tasks 220 to robots 120, robot coordinator 210 may control the designation of robots 120 to different sections 130. For instance, by assigning (at 2) tasks 220-1 and 220-4 that are located in section 130-1 to robot 120-1, robot coordinator 210 may effectively constrain operation of robot 120-1 to section 130-1. In other words, the assignment of tasks can constrain operation of a robot to a particular region without geofencing or otherwise defining the exact coordinates of the particular region and/or without configuring the robot as to the boundaries of the particular region.

Robot coordinator 210 may assign tasks 220 to robots 120 and designate robots 120 to partitioned sections 130 of site 110 based on one or more of the number of robots 120 operating in site 110, the size and/or shape of site 110, the distribution of objects and/or resources for task execution across site 110, performance characteristic of robots 120 (e.g., operating speed, battery capacity, etc.), and/or other criteria. Accordingly, robot coordinator 210 may shape and/or form partitioned sections 130 of site 110 based on the assignment of tasks 220 to robots 120. In some embodiments, robot coordinator 210 may define each section 130 with physical landmarks or coordinates, and/or may configure robots 120 with exact boundaries of a section 130.

In some embodiments, robot coordinator 210 may dynamically adjust the logical boundaries of each section 130 and/or physical region in which each 120 exclusively operates based on new tasks 220 that are received. Robot coordinator 210 may adjust the logical boundaries to better balance the number of tasks 220 that are assigned to robots 120. For instance, when a set of tasks are concentrated about a single section, robot coordinator 210 may reshape that section so that more than one robot can perform different tasks without conflict.

Figure 3:
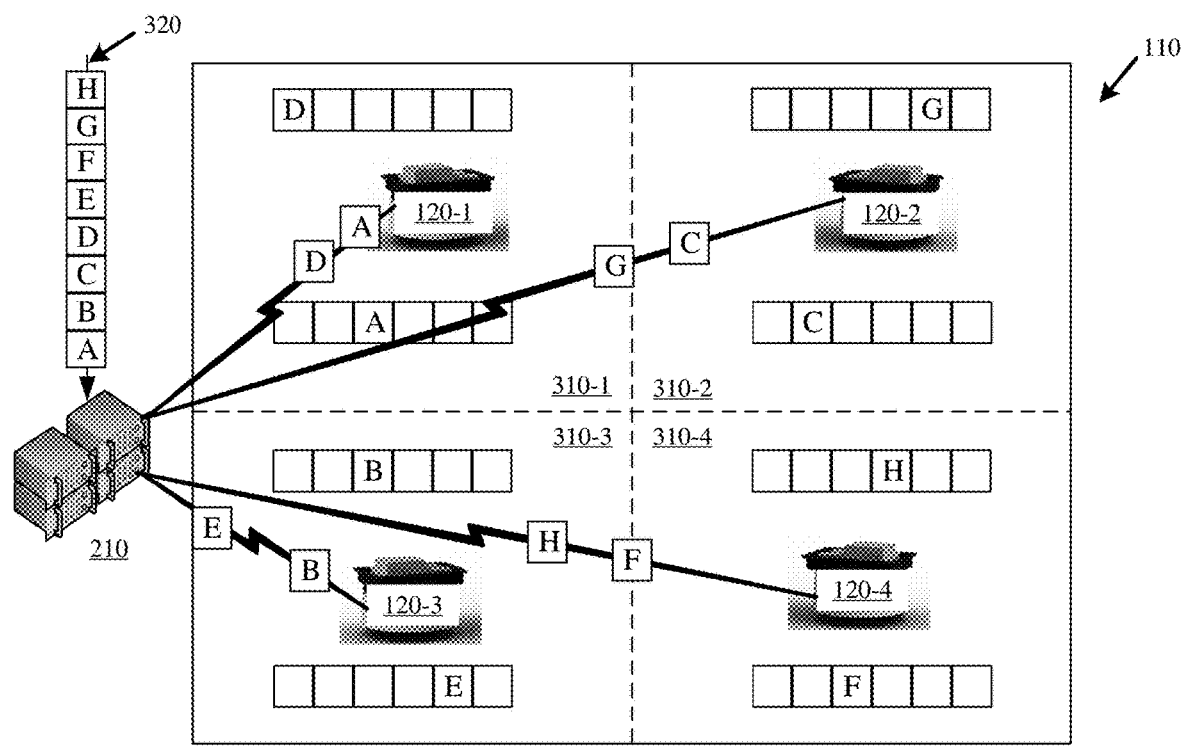
FIG. 3 illustrates the dynamic reshaping of the partitioned sections in accordance with some embodiments described herein.
Figure 3:
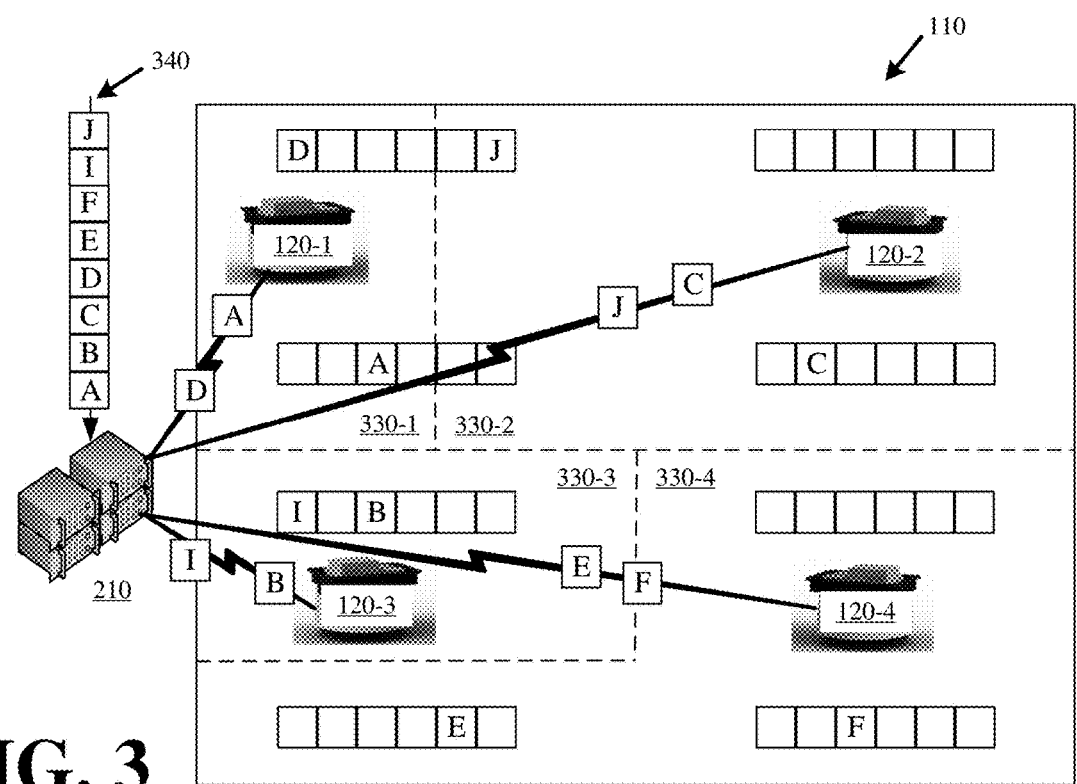

FIG. 3 illustrates the dynamic reshaping of the partitioned sections in accordance with some embodiments described herein. FIG. 3 illustrates a first partitioning of site 110 into a first set of sections 310-1, 310-2, 310-3, and 310-4 based a first distribution of a set of tasks 320 for robots 120 to execute. The first set of tasks 320 are equally distributed across site 110 such that sections 310 are equally sized with a robot 110 in each section 310 performing the same number of tasks.

FIG. 3 then illustrates a second partitioning of site 110 into a second set of sections 330-1, 330-2, 330-3, and 330-4 based on a second distribution of a set of tasks 340 for robots 120 to execute. In particular, robot coordinator 210 may receive set of tasks 340, may map tasks 340 to different locations within site 110, and may determine, based on the mapping, that tasks 340 are concentrated about a left side of site 110. To better balance the work allocation, robot coordinator 210 may repartition site 110 into sections 330 that are of different shapes and sizes than sections 310 of the initial partitioning. The repartitioning may include shrinking section 310-1 to section 330-1 to accommodate expanding section 310-2 to section 330-2, and shrinking section 310-3 to section 330-3 to accommodate expanding section 310-4 to section 330-4.

It should be noted that the contraction and expansion of sections may be a logical contraction and expansion. The logical contraction and expansion of sections may be based on the distribution and/or assignment of tasks 340 to robots 120 by robot coordinator 210. For instance, robot coordinator 210 may expand sections 330-2 and 330-4 by assigning tasks 350 and 360 from the second set of tasks 340, that would have been sections of 310-1 and 310-3 based on the initial partitioning for the first set of tasks 320, to robots 120-2 and 120-4. Robot coordinator 210 may repartition site 110 so that robots 120-2 and 120-4 perform the same number of tasks from second set of tasks 340 as robots 120-1 and 120-3. In other words, robot coordinator 210 may repartition site 110 so that robots 120-2 and 120-4 are not idle while robots 120-1 and 120-3 perform a disproportionate amount of work, which, in turn, would increase the overall task execution time.

III. Calescing Operation of Robots

The partitioned operation of the robots in the different sections and the execution of tasks in the different sections may result in segmented completion of overall tasks. For instance, an overall task may be fulfilling a customer order for a set of objects that are distributed throughout the different partitioned sections of the site. Through the partitioned operation of the robots, each robot in each section may retrieve some subset of objects for the customer order. Fulfilling the customer order and completing the overall task may therefore include combining the objects that were retrieved in each partitioned section at one location where the customer order may be packaged, shipped, and/or otherwise readied for the customer.

Accordingly, the systems and methods may also include coalescing the tasks executed as a result of the coordinated partitioned operation of the robots. More specifically, the systems and methods further include coordinating the operation of the robots to coalesce the results and/or output from subtasks of an overall task in order to complete the overall task, wherein the results and/or output of the subtasks are produced from the coordinated partitioned operation of the robots.

In some embodiments, robot coordinator 210 may coordinate and/or control a first set of robots for the partitioned execution of the tasks, and may coordinate and/or control a different second set of robots for coalescing the results and/or outputs from the partitioned execution of the tasks. In some embodiments, robot coordinator 210 may coordinate and/or control the same set of robots for the partitioned execution of the tasks, and also for the coalescing of the results and/or outputs from the partitioned execution of the tasks.

Figure 4A:
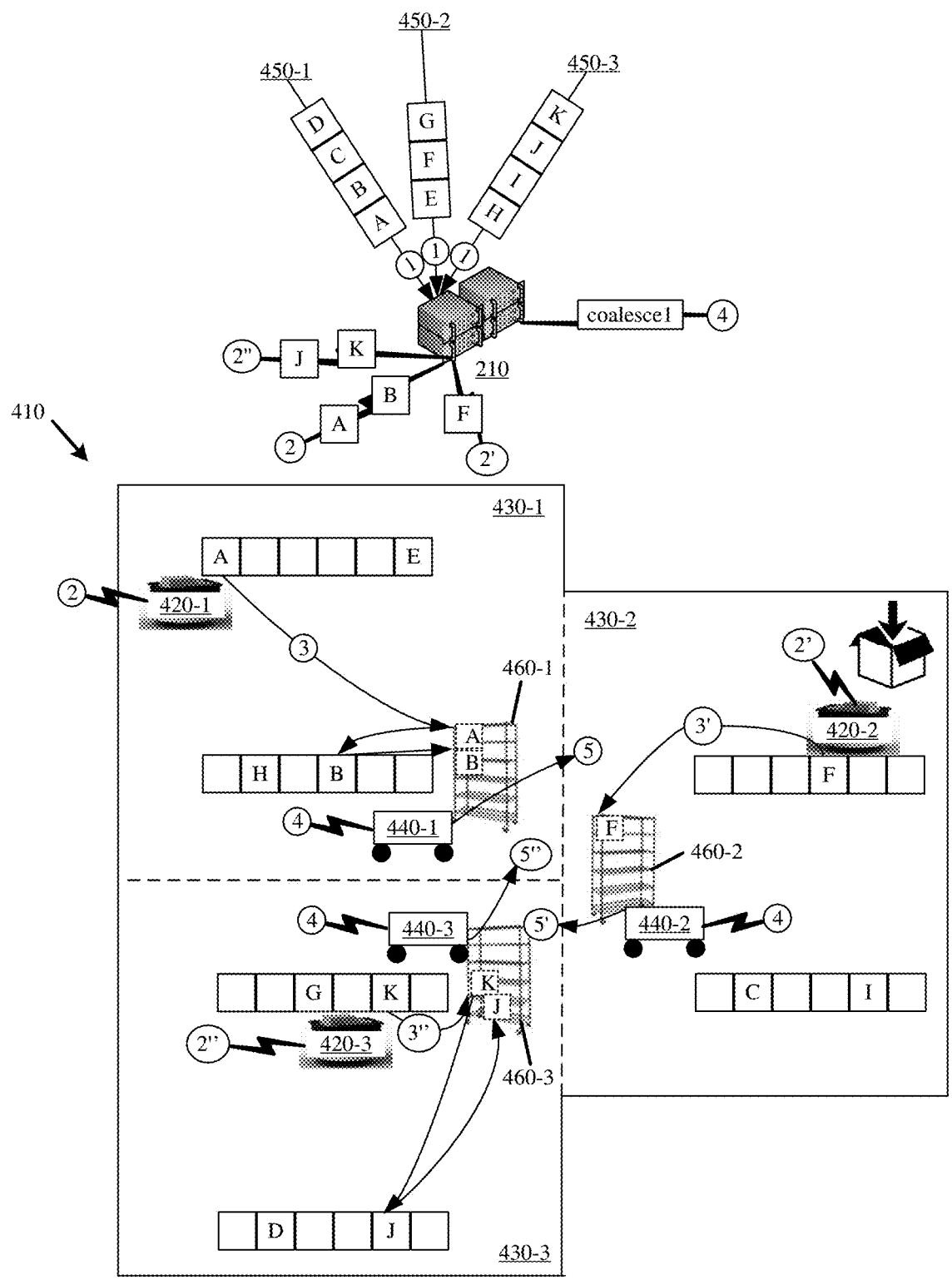
FIGS. 4A, 4B, and 4C conceptually illustrate automated and coordinated operation of a set of robots to coalesce results and/or outputs from the partitioned execution of tasks in accordance with some embodiments described herein.
Figure 4B:
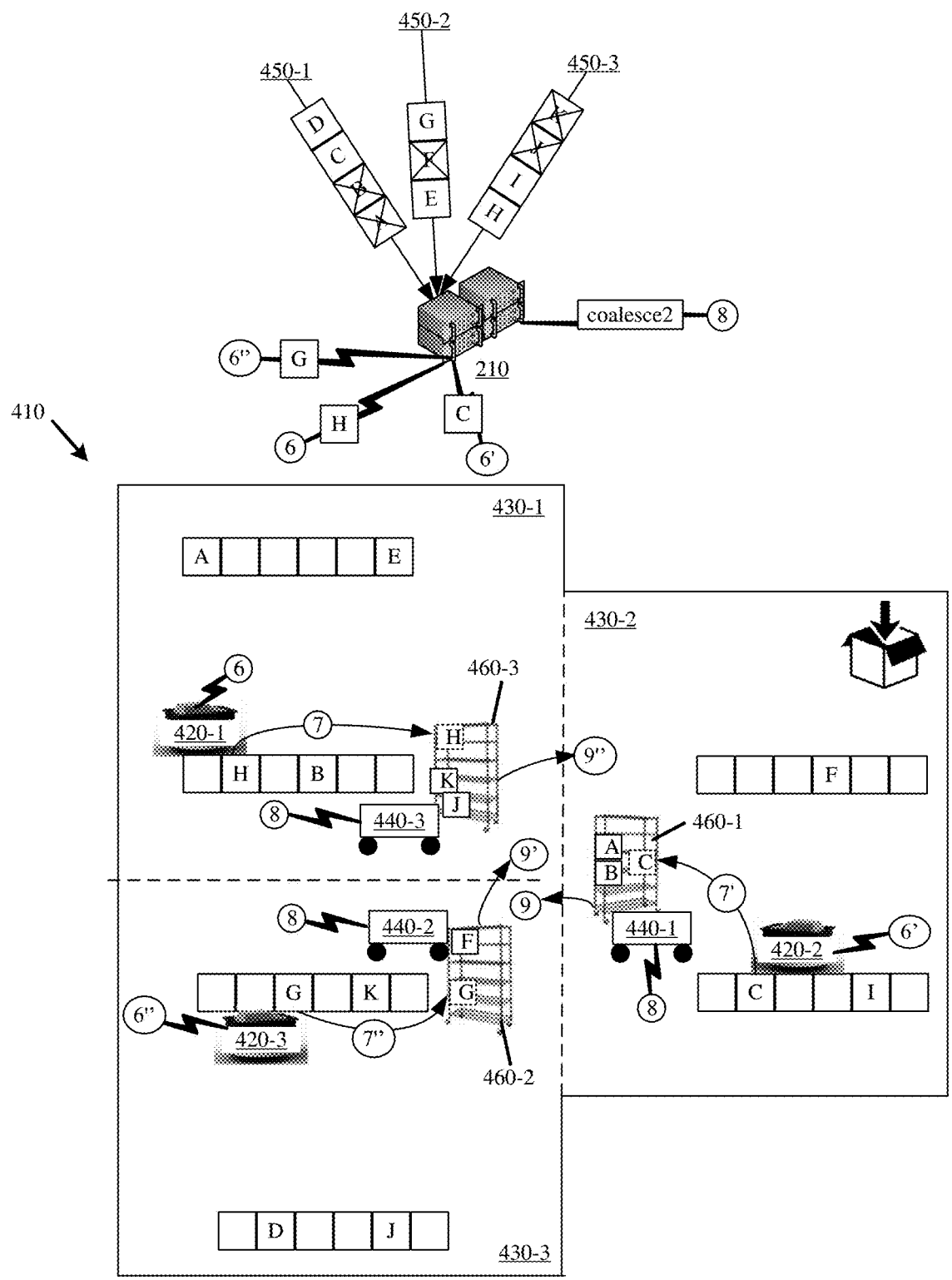
Figure 4C:
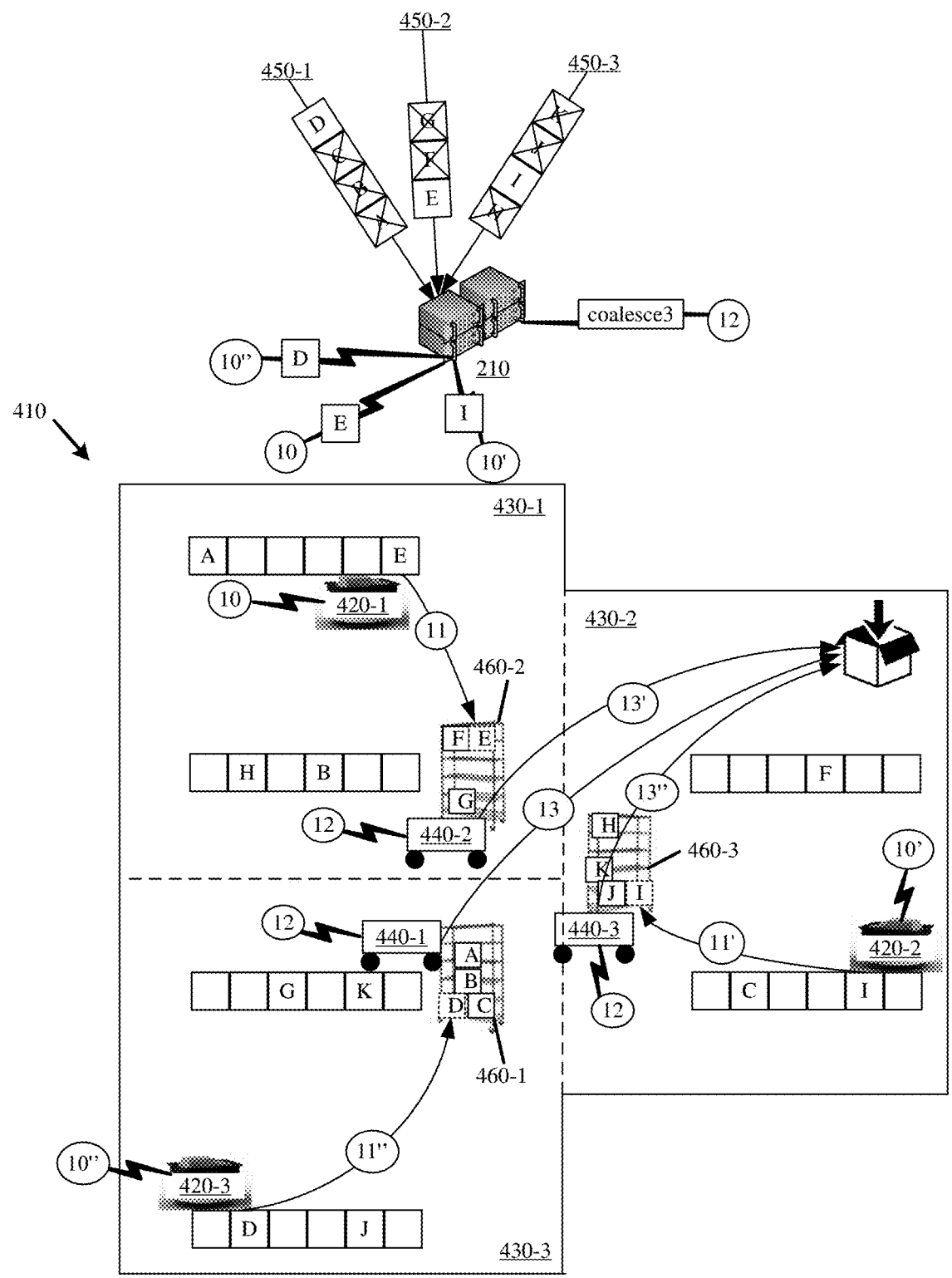

FIGS. 4A, 4B, and 4C conceptually illustrate automated and coordinated operation of a set of robots to coalesce results and/or outputs from the partitioned execution of tasks in accordance with some embodiments described herein. FIG. 4A illustrates a site 410 in which retrieval robot 420-1 performs different tasks in first section 430-1 of site 410, retrieval robot 420-2 performs different tasks in second section 430-2 of site 410, retrieval robot 420-3 performs different tasks in partitioned third section 430-3 of site 410, and transfer robots 440-1, 440-2, and 440-3 coalesce the results and/or output of tasks from different sections 430 in order to complete overall tasks based on the partitioned execution of tasks performed in each section 430.

Robot coordinator 210 coordinates and/or controls the partitioned execution of tasks by robots 420 in conjunction with the coalescing of executed tasks by robots 440. Robot coordinator 210 coordinates and/or controls robots 420 and 440 in response to receiving (at 1) first, second, and third customer orders 450-1, 450-2, and 450-3.

Robot coordinator 210 may map storage locations for objects of first, second, and third customer orders 450-1, 450-2, and 450-3 to storage locations within sections 430-1, 430-2, and 430-3, and may coordinate initial robot partitioned execution of the tasks by assigning (at 2) tasks for retrieving objects of first customer order 450-1 within section 430-1 to robot 420-1, assigning (at 2') tasks for retrieving objects of second customer order 450-2 within section 430-2 to robot 420-2, and assigning (at 2") tasks for retrieving objects of third customer order 450-3 within section 430-3 to robot 420-3. In some embodiments, the objects may be different items that can be individually retrieved by robots 420 from the identified storage locations. In some embodiments, the objects may be totes, bins, or other containers that store multiple units of the same or different items. In some such embodiments, robots 420 may retrieve the totes or containers, and an ordered quantity of an ordered item may be later retrieved from the totes or containers by robots 420, other robots, or human workers.

In response to the initial assignment (at 2, 2', and 2") of tasks by robot coordinator 210, first robot 420-1 retrieves (at 3) one or more objects for first customer order 450-1 from within section 430-1, and places (at 3) the retrieved objects to first storage rack 460-1 that is located in section 430-1. Second robot 420-2 retrieves (at 3') one or more objects for second customer order 450-2 from within section 430-2, and places (at 3') the retrieved objects to second storage rack 460-2 that is located in section 430-2. Third robot 420-3 retrieves (at 3") one or more objects for third customer order 450-3 from within section 430-3, and places (at 3") the retrieved objects to third storage rack 460-3 that is located in section 430-3. Storage racks 460-1, 460-2, and 460-3 may be carts, racks, containers, and/or another storage apparatus that can be moved throughout site 410 and that can be used to store objects of one or more different customer orders. In some embodiments, storage racks 460 are independent units that can be moved by transfer robots 440. In some other embodiments, storage racks 460 are storage units that are attached to transfer robots 440 or that are otherwise carried by transfer robots 440. For instance, storage rack 460 may be a box that is transferred by a transfer robot 440 in order to collect picked objects pertaining to a customer order from retrieval robots 420 operating in different sections 430. Accordingly, storage racks 460 may include any movable storage unit.

Robot coordinator 210 may monitor completion of the first partitioned set of tasks based on signaling from robots 420-1, 420-2, and 420-3. For instance, after every object is retrieved by a robot 420 to a storage rack 460, the robot 420 may provide an identifier of the object to robot coordinator 210, and robot coordinator 210 may track successful retrieval of that object based on the provided identifier.

Once the first partitioned set of tasks are complete, robot coordinator 210 may coordinate and/or control transfer robots 440 in performing a first set of coalescing operations. As shown, robot coordinator 210 may direct (at 4) transfer robot 440-1 to move (at 5) storage rack 460-1 from first section 430-1 to second section 430-2, may direct (at 4) transfer robot 440-2 to move (at 5') storage rack 460-2 from second section 430-2 to third section 430-3, and may direct (at 4) transfer robot 440-3 to move (at 5") storage rack 460-3 from third section 430-3 to first section 430-1. In other words, transfer robots 440 rotate storage racks 460 through sections 430.

FIG. 4B then illustrates robot coordinator 210 directing (at 6, 6', and 6") retrieval robots 420 in performing a second set of partitioned tasks after transfer robots 440 have performed the first coalescing operation and moved (at 5, 5', and 5") storage racks 460 to different sections 430. As shown in FIG. 4B, robot coordinator 210 may coordinate and/or control retrieval robot 420-1, operating in section 430-1, to retrieve and place (at 7) one or more objects of third customer order 450-3 from storage locations in section 430-1 to storage rack 460-3, that is now in section 430-1 because of operation of transfer robot 440-3, and that stores one or more objects of third customer order 450-3 previously retrieved from within third section 430-3. Similarly, retrieval robot 420-2, operating in section 430-2, may retrieve and place (at 7') one or more objects of first customer order 450-1 from storage locations in section 430-2 to storage rack 460-1, that is now in section 430-2 because of operation of transfer robot 440-1, and that stores one or more objects of first customer order 450-1 previously retrieved from within first section 430-1. Retrieval robot 420-3, operating in section 430-3, may retrieve and place (at 7") one or more objects for second customer order 450-2 from storage locations in section 430-3 to storage rack 460-2, that is now in section 430-3 because of operation of transfer robot 440-2, and that stores one or more objects of second customer order 450-2 previously retrieved from within second section 430-2.

Robot coordinator 210 may issue (at 8) a second set of coalescing operations to transfer robots 440 once retrieval robots 420 signal completion of the second set of partitioned tasks. In response to issuing (at 8) the second set of coalescing operations, transfer robot 440-1 may move (at 9) storage rack 460-1 from second section 430-2 to third section 430-3, transfer robot 440-2 may move (at 9') storage rack 460-2 from third section 430-3 to first section 430-1, and transfer robot 440-3 may move (at 9") storage rack 460-3 from first section 430-1 to second section 430-2.

FIG. 4C illustrates robot coordinator 210 directing (at 10, 10', and 10") retrieval robots 420 in performing a third set of partitioned tasks after transfer robots 440 have performed the second coalescing operation and moved (at 9, 9', and 9") storage racks 460 to different sections 430. As shown in FIG. 4C, the coordinated partitioned operation of the third set of partitioned tasks may include retrieval robot 420-1 retrieving (at 11) objects for second customer order 450-2 from within first section 430-1, and placing (at 11) the retrieved objects to storage rack 460-2 now in first section 430-1. Similarly, retrieval robot 420-1 may retrieve (at 11') objects for third customer order 450-3 from within second section 430-2, and may place (at 11') the retrieved objects to storage rack 460-3 now in second section 430-2. Retrieval robot 420-3 may also retrieve (at 11') objects for first customer order 450-1 from within third section 430-3, and may place (at 11") the retrieved objects to storage rack 460-1 now in third section 430-3.

After completion of the third set of partitioned tasks by retrieval robots 420, each storage rack 460 contains all objects for one of customer orders 450-1, 450-2, or 450-3. Stated different, all objects for a different customer order 450 are coalesced to a different storage rack 460. Robot coordinator 210 may then coordinate and/or control (at 12) transfer robots 440 in moving (at 13, 13', and 13") storage racks 460 to a packing station where customer orders 450 can be fulfilled, shipped, and/or otherwise readied for fulfillment.

In some embodiments, site 410 may include more than one packing station. For instance, a packing station may be located in each section 430 so that transfer robots 440 have less distance to travel to complete their tasks and bring a coalesced storage rack 460 for fulfillment or overall task completion.

In some embodiments, the objects for two or more customer orders may be retrieved from within one section by one or more retrieval robots operating in that section, and the retrieved objects for the different customer orders may be placed on a storage rack in that section before moving the storage rack to a different section. In this manner, each storage rack may be used to coalesce the objects of two or more customer orders, thereby increasing the number of orders that are fulfilled with each complete rotation of the storage rack through the partitioned sections of a site. Robot coordinator 210 may coordinate and control the number of tasks or customer orders that are completed with each complete rotation through the partitioned sections of the site.

To reduce the number of coalescing operations performed by transfer robots 440 and/or rotations of storage racks 460, robot coordinator 210 may direct transfer robots 440 in placing one storage rack 460 at a boundary of two different sections. Retrieval robots 420 from the two neighboring sections may then place objects for the same customer order onto storage rack 460 before it is transferred to the boundary of two different sections.

Figure 5A:
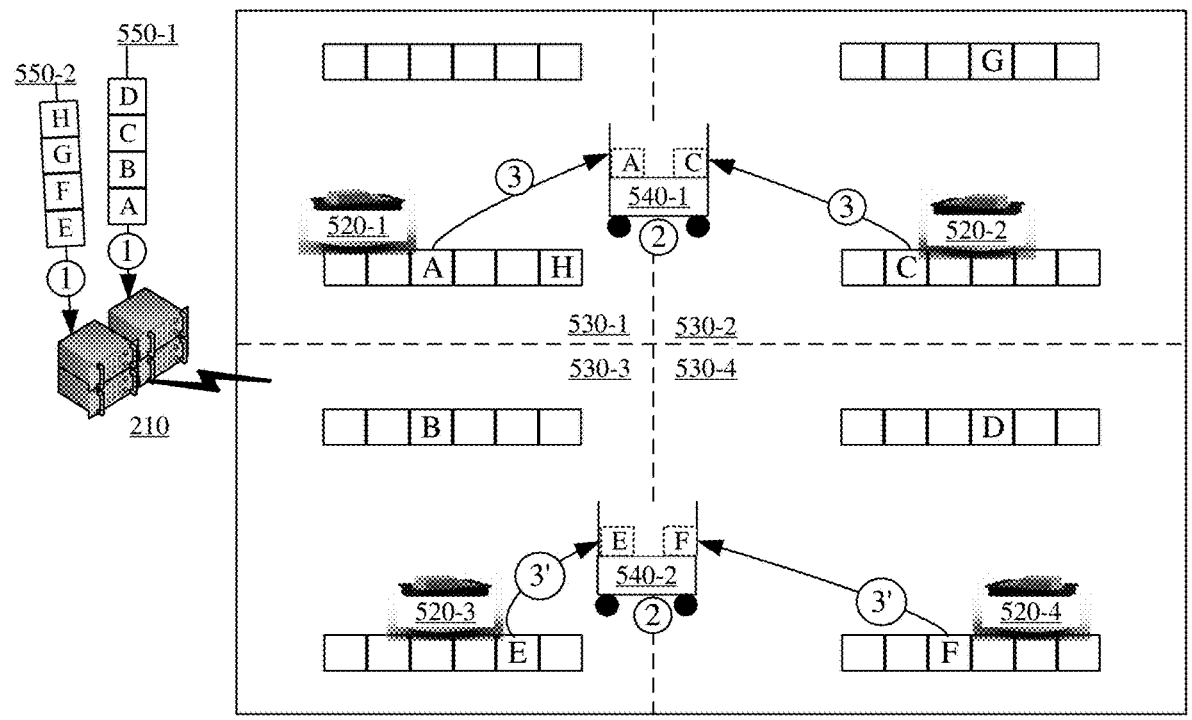
FIGS. 5A and 5B illustrate an example of reducing coalescing operations by boundary placement of storage racks in accordance with some embodiments described herein.
Figure 5B:
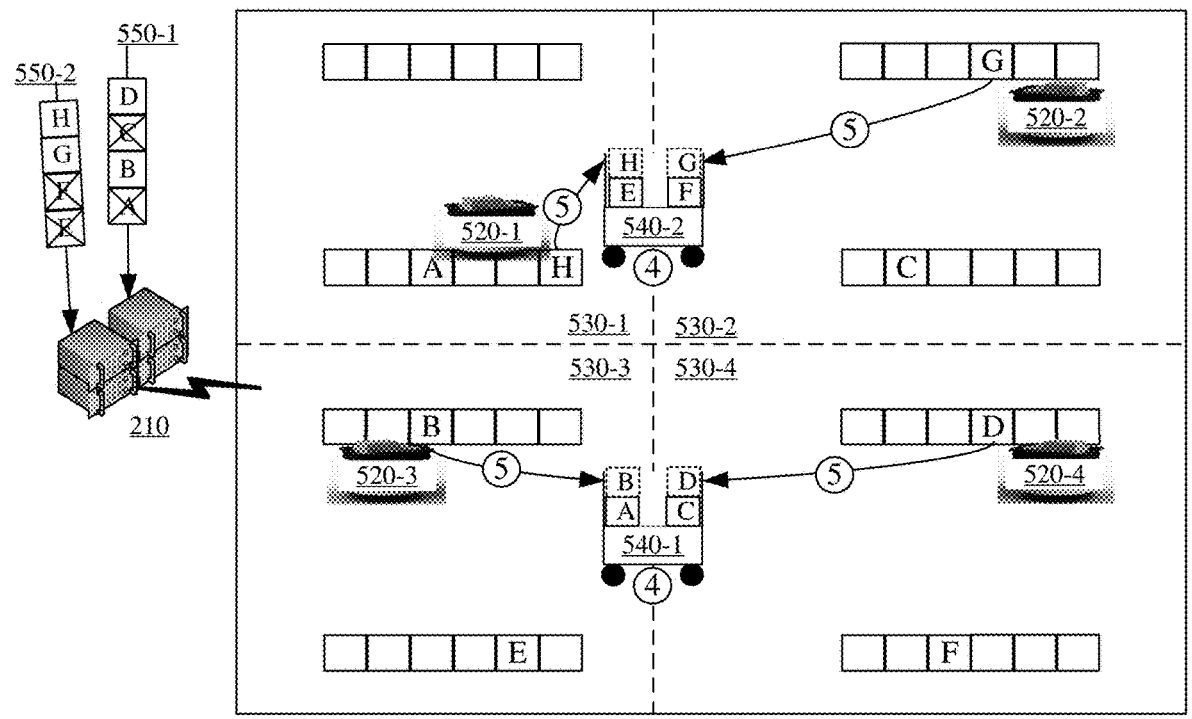

FIGS. 5A and 5B illustrate an example of reducing coalescing operations by boundary placement of storage racks in accordance with some embodiments described herein. In FIG. 5A, robot coordinator 210 may receive (at 1) two different customer orders 550-1 and 550-2 with objects that are stored in four different sections 530-1, 530-2, 530-3, and 530-4 of a site. The partitioned operation may include retrieval robot 520-1 operating in section 530-1, retrieval robot 520-2 operating in section 530-2, retrieval robot 520-3 operating in section 530-3, and retrieval robot 520-4 operating in section 530-4.

In response to the received customer orders 550-1 and 550-2, robot coordinator 210 may direct transfer robot 540-1 in positioning (at 2) a first storage unit (e.g., attached to, carried by, otherwise moved by transfer robot 540-1) at the boundary of sections 530-1 and 530-2, and transfer robot 540-2 in positioning (at 2) a second storage unit at the boundary of sections 530-3 and 530-4. Robot coordinator 210 may then direct retrieval robots 520-1 and 520-2 in retrieving (at 3) objects of first customer order 550-1 to the first storage unit, and retrieval robots 520-3 and 520-4 in retrieving (at 3') objects of second customer order 550-2 to the second storage unit. As each retrieval robot 520 retrieves and places an object to a storage unit, the retrieval robot 520 may scan an object identifier, and provide the object identifier to robot coordinator 210.

Based on the provided object identifiers from the retrieval robots 520, robot coordinator 210 may determine that the objects of first customer order 550-1 in sections 530-1 and 530-2 have been placed into the first storage unit, and that the objects of second customer order 550-2 in sections 530-3 and 530-4 have been placed in to the second storage unit. Robot coordinator 210 may further determine that the remaining objects of first customer order 550-1 are located in sections 530-3 and 530-4, and that the remaining objects of second customer order 550-2 are located in sections 530-1 and 530-2. Accordingly, robot coordinator 210 may direct transfer robots 540 in moving the storage units to different sections 530 for additional coalescing and to complete the order retrieval operations.

FIG. 5B illustrates transfer robot 540-1 moving (at 4) the first storage unit to the boundary between sections 530-3 and 530-4 so that retrieval robots 520-3 and 520-4 can place (at 5) the remaining and all objects of first customer order 550-1 on the first storage unit. Transfer robot 540-2 also moves (at 4) the second storage unit the boundary between sections 530-1 and 530-1 so that retrieval robots 520-1 and 520-2 can place (at 5) the remaining and all objects of second customer order 550-2 on the second storage unit.

With objects of first customer order 550-1 coalesced to the first storage unit, transfer robot 540-1 may move the first storage unit to a packing station where first customer order 550-1 may be fulfilled, packaged, and/or shipped. Similarly, with objects of second customer order 550-2 coalesced to the second storage unit, transfer robot 540-2 may move the second storage unit to a packing station where second customer order 550-2 may be fulfilled, packaged, and/or shipped.

Figure 6A:
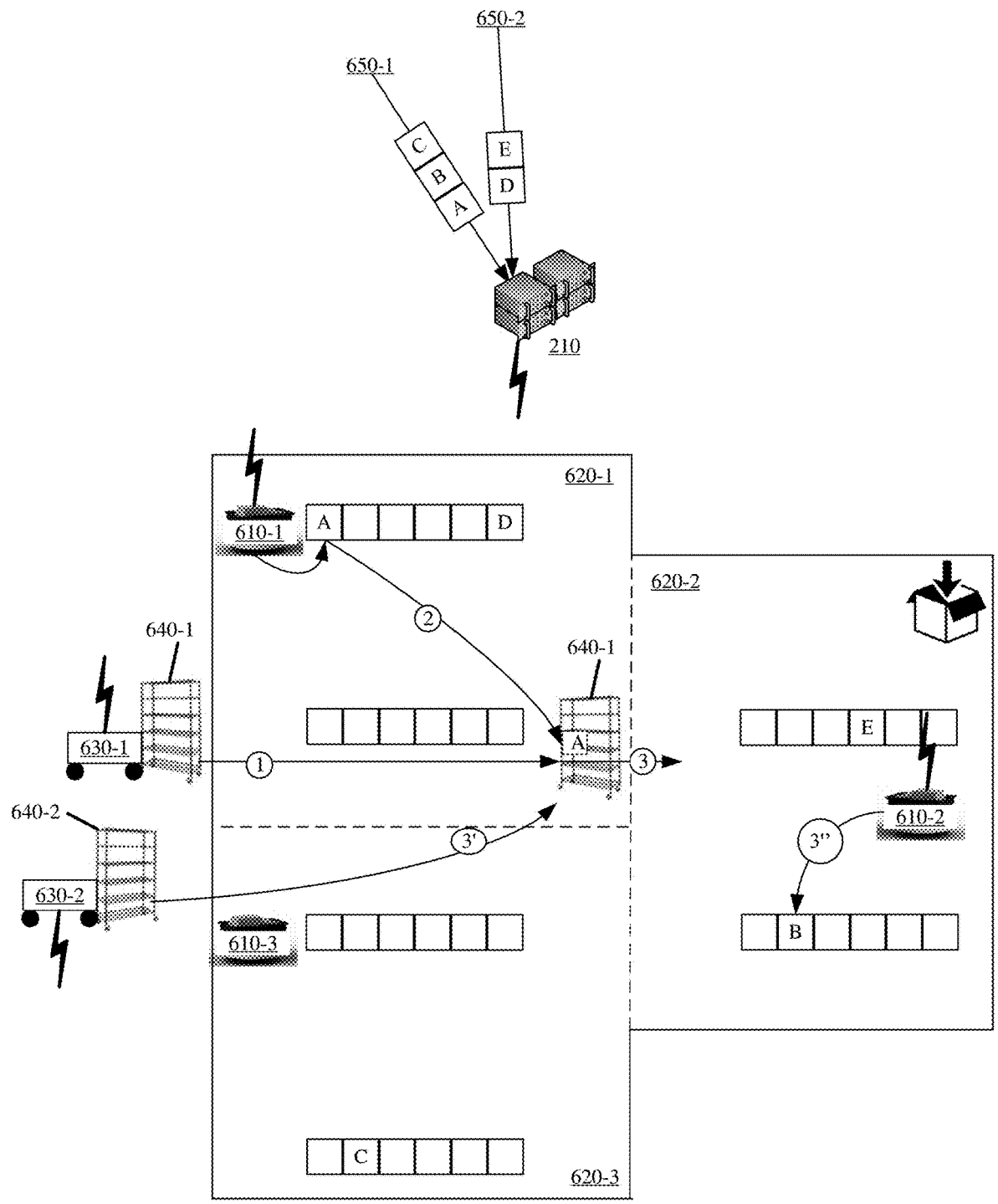
FIGS. 6A, 6B, and 6C illustrate another methodology for coordinated operation of a set of robots to coalesce the results and/or outputs from the partitioned execution of the tasks in accordance with some embodiments described herein.
Figure 6B:
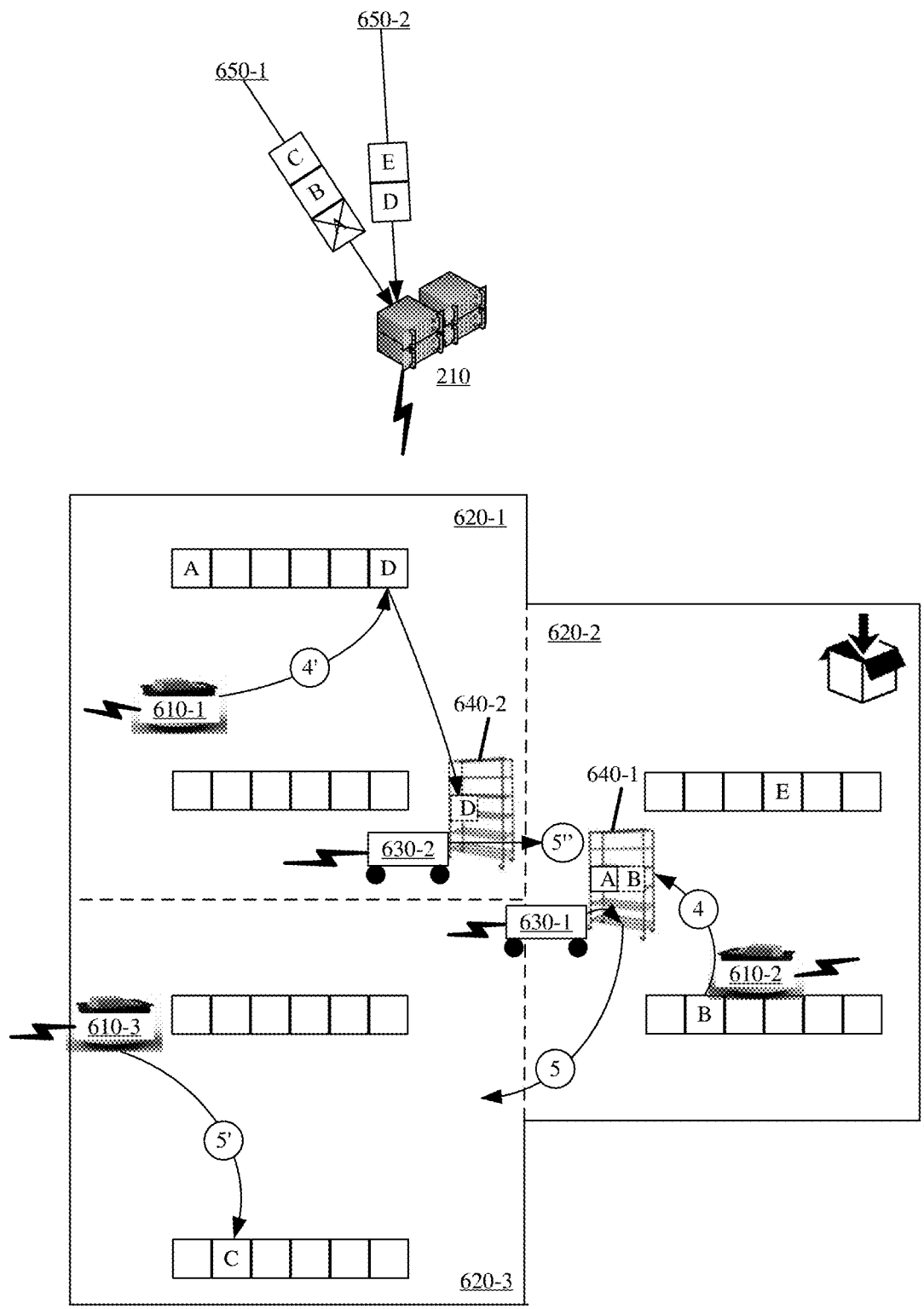
Figure 6C:
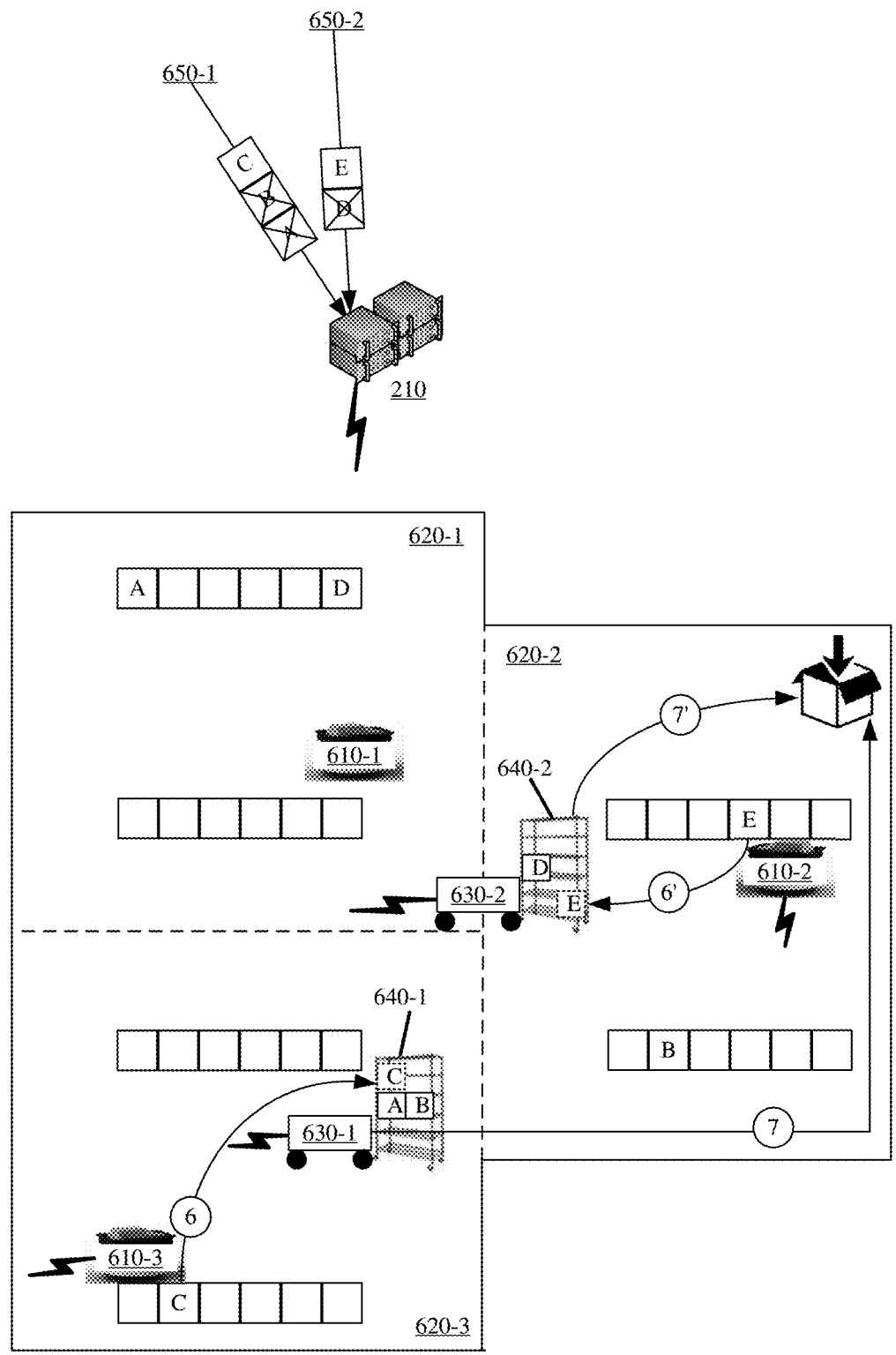

FIGS. 6A, 6B, and 6C illustrate another methodology for coordinated operation of a set of robots to coalesce the results and/or outputs from the partitioned execution of the tasks in accordance with some embodiments described herein. FIG. 6A illustrates robot coordinator 210, retrieval robots 610-1, 610-2, and 610-3 operating in different sections 620-1, 620-2, and 620-3 of a site, transfer robots 630-1 and 630-2, and storage racks 640-1 and 640-2. Robot coordinator 210 coordinates and controls robots 610 and 630 in coalescing objects of first customer order 650-1 to storage rack 640-1 and objects of second customer order 650-2 to storage rack 640-2 albeit in a different than illustrated above in FIGS. 4A-4C.

As shown in FIG. 6A, first transfer robot 630-1 brings (at 1) new or empty storage rack 640-1 into first section 620-1 based on direction from robot coordinator 210. Retrieval robot 610-1, operating in first section 620-1, may retrieve (at 2) an object for first customer order 650-1 that is located in first section 620-1, and may place (at 2) the retrieved object on storage rack 640-1 based on robot coordinator 210 assigning to retrieval robot 610-1 tasks for retrieving objects of first customer order 650-1 that are in first section 620-1 when storage rack 640-1 is located in first section 620-1.

Retrieval robot 610-1 may signal to robot coordinator 210 when the object of first customer order 650-1 has been placed on storage rack 640-1. Robot coordinator 210 may determine that no other objects for first customer order 650-1 are located in first section 620-1, and may direct first transfer robot 630-1 in moving (at 3) storage rack 640-1 from first section 620-1 to second section 620-2. Robot coordinator 210 may also direct second transfer robot 630-2 in moving (at 3') new and/or empty storage rack 640-2, on which objects of second customer order 650-2 are to be coalesced, into first section 620-1 and/or directing retrieval robot 610-2, operating in second section 620-2, in retrieving (at 3") an object for first customer order 650-1 that is located in second section 620-2.

FIG. 6B illustrates retrieval robot 610-2 placing (at 4) a second object of first customer order 650-1 that is located in second section 620-2 onto storage rack 640-1 that transfer robot 630-1 has moved (at 3) into second section 620-2. Retrieval robot 610-2 may signal to robot coordinator 210 when the second object of first customer order 650-1 has been placed on storage rack 640-1. Robot coordinator 210 may determine that no other objects for first customer order 650-1 are located in second section 620-2, and may direct first transfer robot 630-1 in moving (at 5) storage rack 640-1 from second section 620-2 to third section 620-3. Robot coordinator 210 may also direct retrieval robot 610-3, operating in third section 620-3, in retrieving (at 5') an object for first customer order 650-1 that is located in third section 620-3.

Contemporaneously and as also shown in FIG. 6B, retrieval robot 610-1 may retrieve and place (at 4') an object of second customer order 650-2 that is located in first section 620-1 onto storage rack 640-2 that transfer robot 630-2 has moved (at 3') into first section 620-1. Retrieval robot 610-1 may signal to robot coordinator 210 when the object of second customer order 650-2 has been placed on storage rack 640-2. Robot coordinator 210 may determine that no other objects for second customer order 650-2 are located in first section 620-1, and may direct second transfer robot 630-2 in moving (at 5") storage rack 640-2 from first section 620-1 to second section 620-2.

FIG. 6C illustrates retrieval robot 610-3 placing (at 6) a third and final object of first customer order 650-1 that is located in third section 620-3 onto storage rack 640-1. Retrieval robot 610-3 may signal to robot coordinator 210 when the third object of first customer order 650-1 has been placed on storage rack 640-1. Robot coordinator 210 may determine that all objects of first customer order 650-1 have been coalesced to storage rack 640-1, and may direct first transfer robot 630-1 in moving (at 7) storage rack 640-1 to a packing station where first customer order 650-1 may be fulfilled and/or completed.

Contemporaneously and as also shown in FIG. 6C, retrieval robot 610-2 may retrieve and place (at 6') a second object of second customer order 650-2 that is located in second section 620-2 onto storage rack 640-2. Retrieval robot 610-2 may signal to robot coordinator 210 when the second object of second customer order 650-2 has been placed on storage rack 640-2. Robot coordinator 210 may determine that all objects of second customer order 650-2 have been coalesced to storage rack 640-2, and may direct second transfer robot 630-2 in moving (at 7') storage rack 640-2 from second section 620-2 to packing station.

Robot coordinator 210 may direct transfer robots 630 in continually bringing new or empty storage racks 640 into first section 620-1 and moving storage racks 640 across sections 620 so that execution flow is not interrupted as new customer orders arrive. Also, the location and number of packing stations may be changed. For instance, packing station may be moved inside section 620-3. Transfer robots 630 may move storage racks 640 into section 620-3 after storage racks 640 are first moved into other sections 620

(e.g., section 620-1 and 620-2) so that the final transfer to packing station can be completed with a minimal amount of distance.

In some embodiments, the coordinated robotic operation may be between retrieval robots and one or more automated conveyor belts that are under control of robot coordinator 210, and that move through each of the sections. In some such embodiments, the automated conveyor belts may be used as a substitute for the transfer robots.

Figure 7A:
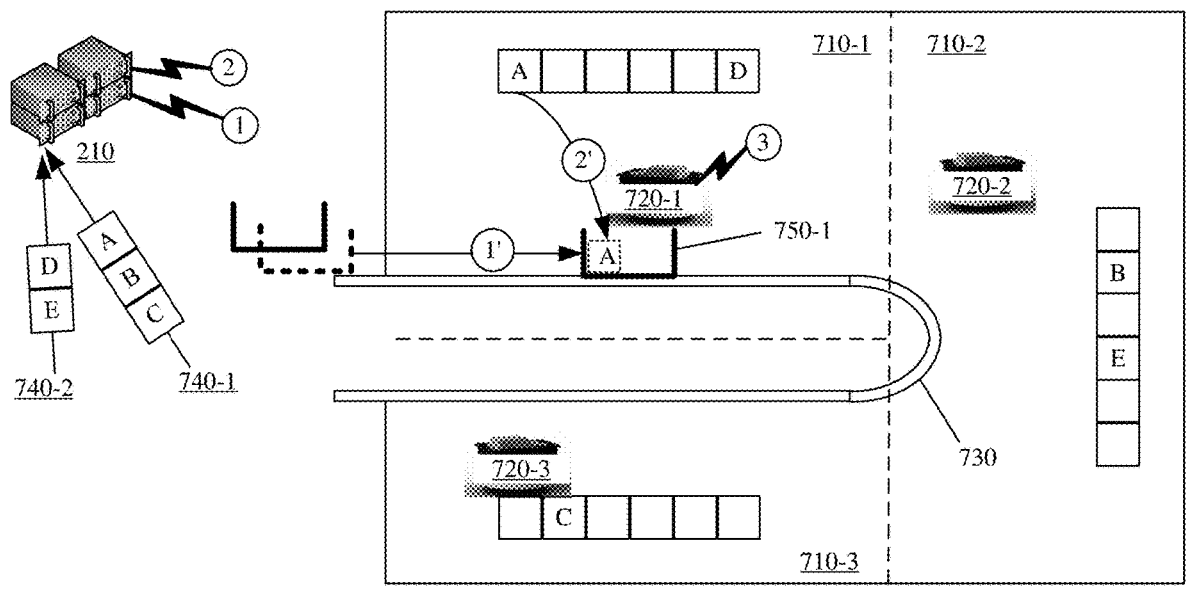
FIGS. 7A, 7B, and 7C illustrate coordinated operation between retrieval robots and automated conveyor belts for coalescing the results and/or outputs from the partitioned execution of the tasks in accordance with some embodiments described herein.
Figure 7B:
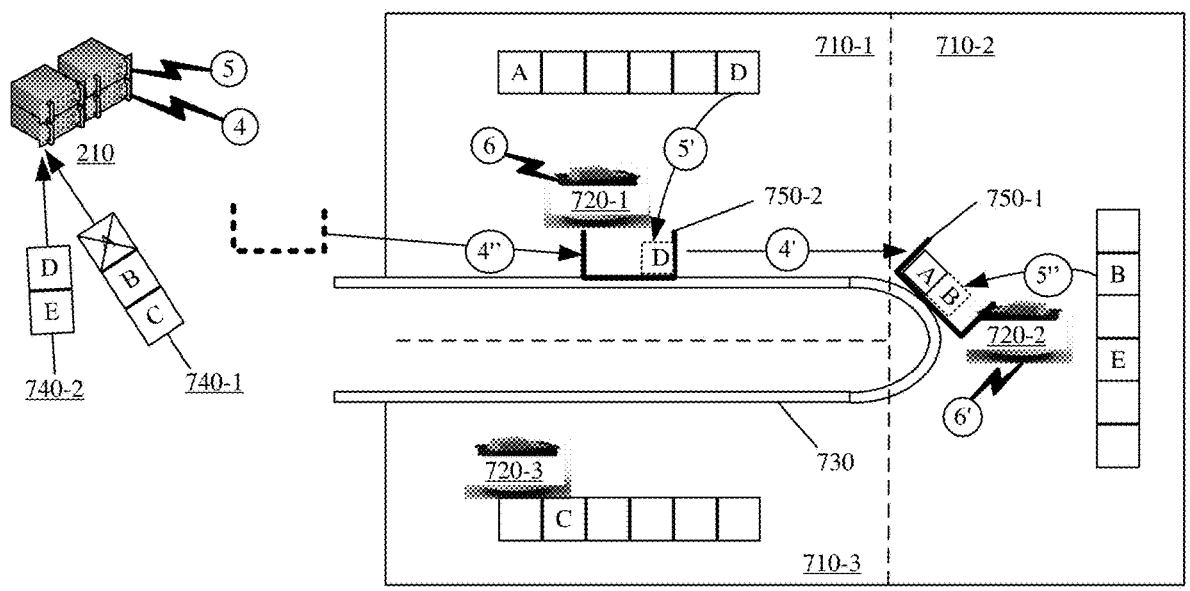
Figure 7C:
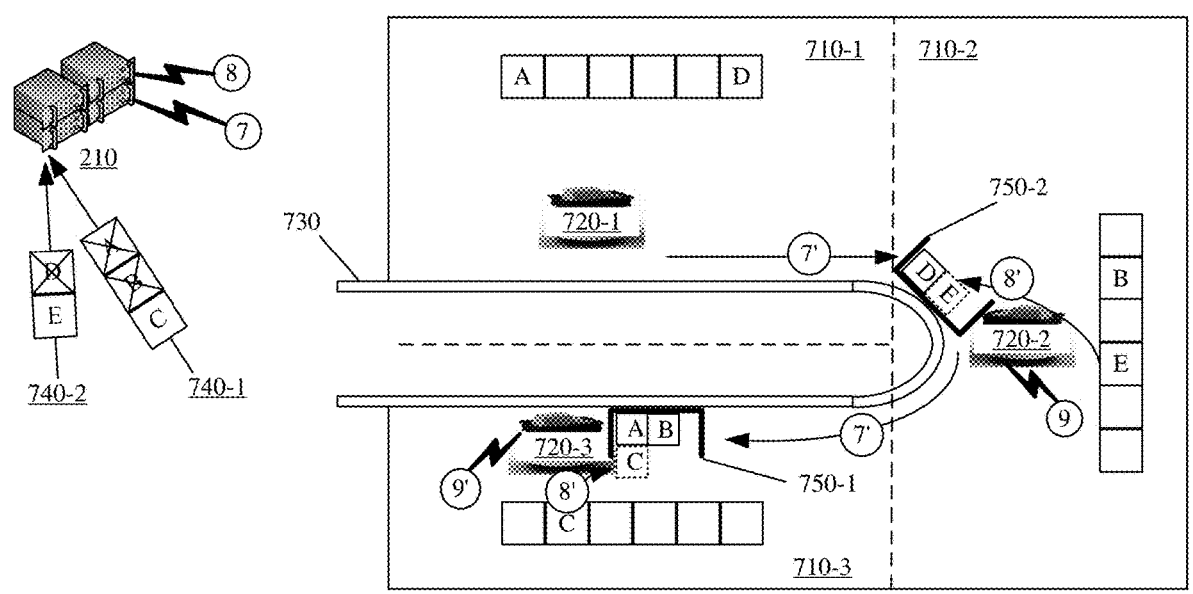

FIGS. 7A, 7B, and 7C illustrate coordinated operation between retrieval robots and automated conveyor belts for coalescing the results and/or outputs from the partitioned execution of the tasks in accordance with some embodiments described herein. As shown in FIG. 7A, a site may be logically partitioned into zones or sections 710-1, 710-2, and 710-3. Retrieval robot 720-1 performs object retrieval tasks in section 710-1, retrieval robot 720-2 performs object retrieval tasks in section 710-2, and retrieval robot 720-3 performs object retrieval tasks in section 710-3. Also shown is automated conveyor belt 730 that passes through each section 710.

In FIG. 7A, robot coordinator 210 receives two different customer orders 740-1 and 740-2 for two sets of objects that are distributed across storage locations in different sections 710. Robot coordinator 210 activates (at 1) conveyor belt 730 to move (at 1') first receptacle 750-1 into section 710-1. First receptacle 750-1 may remain on conveyor belt 730 at all times and may simply cycle through all sections 710 before arriving at a packing station where it is emptied before recirculating through sections 710 for collection of objects of a different customer order. In this figure, first receptacle 750-1 is designated for collecting all objects of first customer order 740-1. However, in some other embodiments, first receptacle 750-1 may be used to collect objects of two or more customer orders. In some such embodiments, first receptacle 750-1 may include multiple storage units, totes, boxes, or other containers, each of which is used to collect objects of a different customer order.

Robot coordinator 210 may further direct (at 2) retrieval robot 720-1 in retrieving any objects of first customer order 740-1 that are stored in section 710-1. More specifically, robot coordinator may first determine that object "A" from first customer order 740-1 is located in section 710-1, and may direct retrieval robot 720-1 in retrieving that object. As shown, retrieval robot 720-1 retrieves object "A" from a storage location in section 710-1, and places the retrieved object into first receptacle 750-1. In some embodiments, robot coordinator 210 may initiate retrieval robot 720-1 and retrieval robot 720-1 may begin retrieval of object "A" before or contemporaneous with conveyor belt 730 moving first receptacle 730 into section 710-1. In doing so, retrieval robot 720-1 may have already retrieved object "A", and may place object "A" in first receptacle 730 as the receptacle arrives or moves into section 710-1. Retrieval robot 720-1 may provide (at 3) a signal to robot coordinator upon successfully transferring of object "A" into first receptacle 750-1.

Upon receiving the signal that all objects of first customer order 750-1 located in section 710-1 have been retrieved to first receptacle 750-1, robot coordinator 210 may advance to the next partitioned set of tasks. As shown in FIG. 7B, robot coordinator 210 may activate (at 4) conveyor belt 730 to move (at 4') first receptacle 750-1 into second section 710-2 while also moving (at 4") second receptacle Y50-2 into first section 710-1. Robot coordinator 210 may use or designate second receptacle 750-1 for collection of objects of second customer order 740-2.

Before or contemporaneous with the activation (at 4) of conveyor belt 730, robot coordinator 210 may activate operations of retrieval robots 720-1 and 720-2. For instance, robot coordinator 210 may direct (at 5) retrieval robot 720-1 in retrieving (at 5') object "D" and/or other objects of second customer order 740-2 that are located in section 710-1 to second receptacle 750-2, that is now positioned in section 710-1. Similarly, robot coordinator 210 may direct (at 5) retrieval robot 720-2 in retrieving (at 5") object "B" and/or other objects of first customer order 740-1 that are located in section 710-2 to first receptacle 750-1, that is now positioned in section 710-2. Retrieval robot 720-1 may then place (at 5') object "D" of second customer order 740-2 in second receptacle 750-2, and retrieval robot 720 may place (at 5") object "B" of first customer order 740-1 in first receptacle 750-1 which already contains objects of first customer order 740-1 found in section 710-1. Retrieval robots 720-1 and 720-2 signal (at 6 and 6') when the retrieval operations in each section 710-1 and 710-2 are complete.

FIG. 7C illustrates a third phase in the partitioned execution of tasks. In particular, conveyor belt 730 is activated again (at 7'), in response to instruction (at 7) from robot coordinator 210, to shift first receptacle 750-1 to third section 710-3, and second receptacle 750-2 to second section 710-2. Retrieval robots 720 in the respective sections 710 set about retrieving (at 8') objects in their respective sections 710 for the customer order being collected in the receptacle positioned in that section. For instance, retrieval robot 720-3 completes first customer order 740-1 by placing last object "C", that is stored in section 710-3, into first receptacle 750-1, that is now positioned in section 710-3.

In response to retrieval robots 720 signaling (at 9 and 9') completion of the retrieval tasks, robot coordinator 210 may continue execution of the partitioned set of tasks. At this stage, first receptacle 750-1 contains all objects of first customer order 740-1, and can be moved to a packaging station where the objects are removed from first receptacle 750-1, packaged, and shipped to the customer. Alternatively, first receptacle 750-1 may be removed from conveyor belt 730, packaged, and shipped to the customer with a new empty receptacle being placed onto conveyor belt 730.

In some embodiments, retrieval robots 720 directly place retrieved objects onto conveyor belt 730 rather than in receptacle 750. In some such embodiments, retrieval robots 720 may place retrieved objects of a common customer order next to one another on conveyor belt 730 such that when conveyor belt 730 moves the objects to a final destination, a robot or human worker at the final destination can package all objects for a particular customer order from a small section of conveyor belt 730. In other words, all objects of the particular customer order may be placed within a few inches or feet from one another along conveyor belt 730. Robot coordinator 210 may nevertheless coordinate the operation of conveyor belt 730 and retrieval robots 720 so that objects of a common customer order are placed next to one another on conveyor belt 730.

Figure 8:
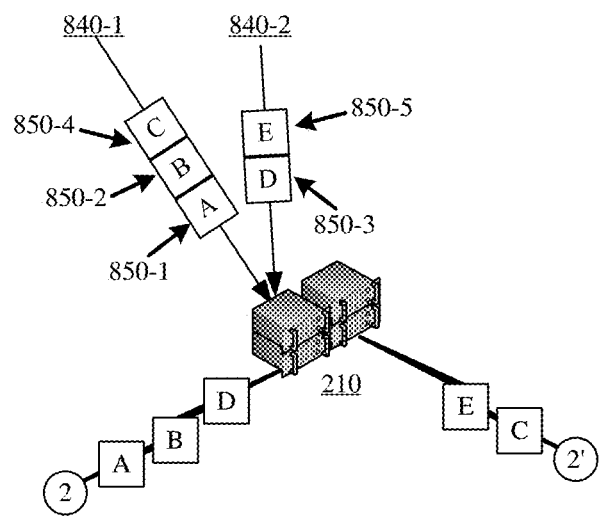
FIG. 8 illustrates another methodology for the automated and coordinated partitioning and coalescing of tasks performed by the robots in accordance with some embodiments presented herein.
Figure 8:
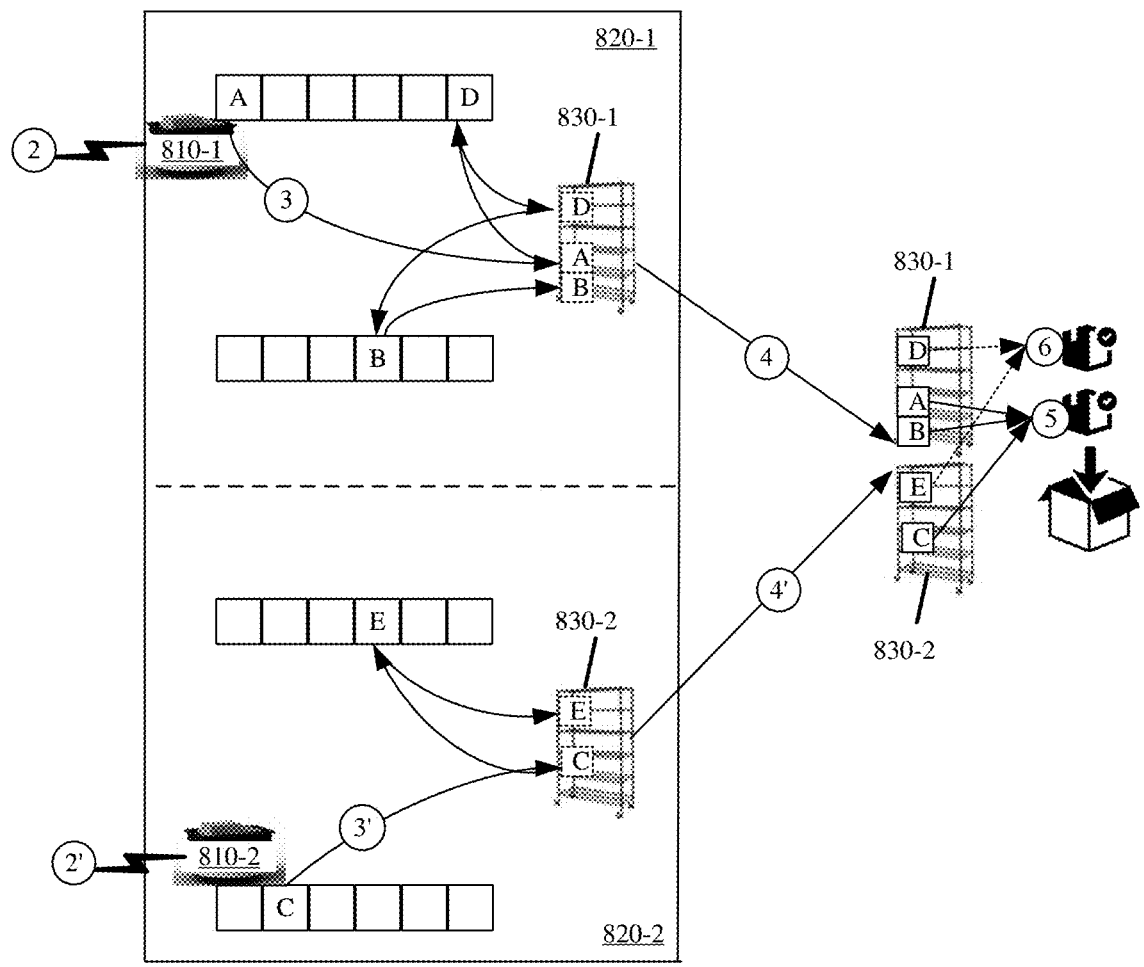

The figures above illustrate different methodologies in which the results and/or output from completed subtasks of a particular overall task are combined via the automated and coordinated partitioning and coalescing of tasks performed by the robots. FIG. 8 illustrates another methodology for the automated and coordinated partitioning and coalescing of tasks performed by the robots in accordance with some embodiments presented herein.

FIG. 8 illustrates retrieval robots 810-1 and 810-2 operating in different partitioned sections 820-1 and 820-2 to retrieve objects to storage racks 830-1 and 830-2 within each respective section 820-1 and 820-2. In this figure, retrieval robots 810-1 and 810-2 retrieve objects for a set of customer orders 840-1 and 840-2. For instance, robot coordinator 210 may receive (at 1) customer orders 840-1 and 840-2, may map storage locations for objects 850-1 and 850-2 of first customer order 840-1 and object 850-3 of second customer order to be in section 820-1, may map storage locations for objects 850-4 of first customer order 840-1 and object 850-5 of second customer order 840-2 to be in section 820-2, may assign (at 2) retrieval tasks for objects 850-1, 850-2, and 850-3 to retrieval robot 810-1, and may assign (at 2') retrieval tasks for objects 850-4 and 850-5 to retrieval robot 810-2.

In response to the task assignments (at 2), retrieval robot 810-1 retrieves (at 3) objects 850-1, 850-2, and 850-3 within first section 830-1, and places (at 3) objects 850-1, 850-2, and 850-3 on storage rack 830-1. In response to the task assignments (at 2'), retrieval robot 810-2 retrieves objects 850-4 and 850-5 within second section 830-2, and places objects 850-4 and 850-5 on storage rack 830-2. Consequently, each storage rack 830-1 and 830-2 may store objects of different customer orders 840-1 and 840-2.

Once retrieval robot 810-1 retrieves and places (at 3) all objects for customer orders 840-1 and 840-2 that are located in section 820-1 to storage rack 830-1 in that section 820-1, retrieval robot 810-1 or another robot may move (at 4) storage rack 830-1 to a packing station. If retrieval robot 810-1 moves (at 3) storage rack 830-1 to the packing station, then another robot may move another and/or empty storage rack 830 into section 820-1, and may begin retrieving and placing objects for a different second set of customer orders to the new storage rack 830. If a transfer robot moves (at 3) storage rack 830-1 to the packing station, then that transfer robot or another transfer robot may bring a new and/or empty storage rack 830 into section 820-1 so that retrieval robot 810-1 can continue retrieving and placing objects for a different set of customer orders to the new storage rack 830. Storage rack 830-2 may also be moved (at 4') to the packing station once all objects for customer orders 840-1 and 840-2 that are located in section 820-2 are retrieved and placed on storage rack 830-2.

In FIG. 8, coalescing occurs as storage racks 830-1 and 830-2 are brought to the packing station. All objects for fulfilling customer orders 840-1 and 840-2 will be present at the packing station once storage racks 830-1 and 830-2 are delivered to the packing station. As shown in FIG. 8, one or more workers and/or robots at the packing station may then compile (at 5) objects 850-1, 850-2, and 850-3 for first customer order 840-1 from storage racks 830-1 and 830-2 to fulfill and complete first customer order 840-1, and may compile (at 6) objects 850-4 and 850-5 for second customer order 840-2 from storage racks 830-1 and 830-2 to fulfill and complete second customer order 840-1 without the workers and/or robots at the packing station having to traverse the site.

Figure 9:
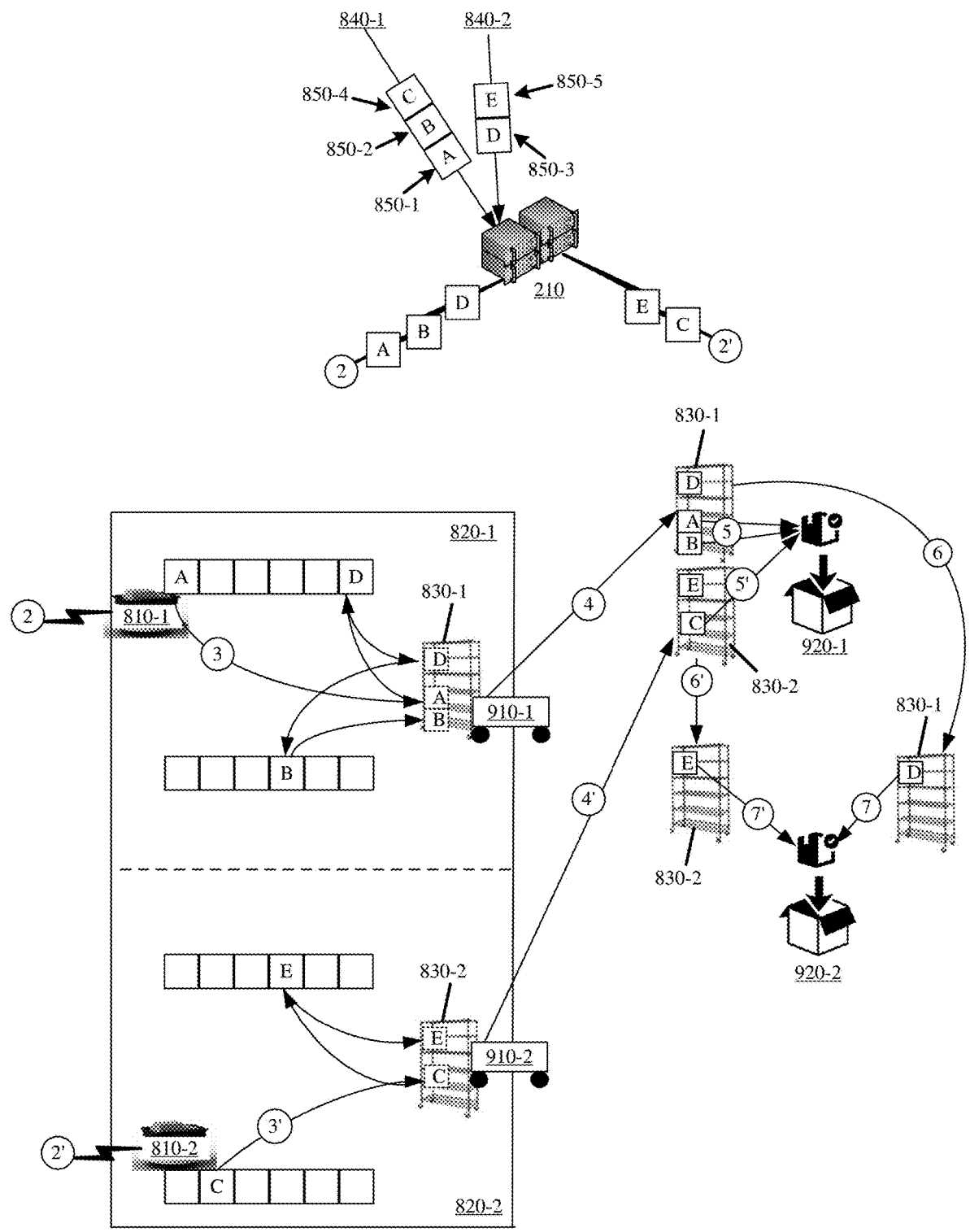
FIG. 9 illustrates example automated operation of transfer robots completing coalescing operations in order to complete overall tasks in accordance with some embodiments described herein.

In some embodiments, storage racks 830-1 and 830-2 may be taken to different packing stations where objects of a customer order 840-1 or 840-2 are coalesced in order to fulfill and complete the overall task. For instance, and as shown in FIG. 9, once all objects of customer orders 840-1 or 840-2 that are located in section 820-1 are placed (at 3) on storage rack 830-1, transfer robot 910-1 may first move (at 4) storage rack 830-1 to first packing station 920-1 where objects 850-1 and 850-2 are removed from storage rack 830-1 and placed (at 5) in a first package for first customer order 840-1. Transfer robot 910-1 may then move (at 6) storage rack 830-1 to second packing station 920-2 where object 850-4 is removed from storage rack 830-1 and placed (at 7) in a second package for second customer order 840-2.

As transfer robot 910-1 moves (at 6) storage rack 830-1 from first packing station 920-1 to second packing station 920-2, another transfer robot 910-2 may move (at 4') storage rack 830-2 to first packing station 920-1. The remaining objects for first customer order 840-1 (e.g., object 850-3) may be removed from storage rack 830-2 and placed (at 5') in the first package to fulfill and complete first customer order 840-1. Transfer robot 910-2 may then move (at 6') storage rack 830-2 to the second packing station 920-2 where the remaining objects for second customer order 840-2 (e.g., object 850-4) may be removed from storage rack 830-2 and placed (at 7') in the second package to fulfill and complete second customer order 840-2.

Figure 10:
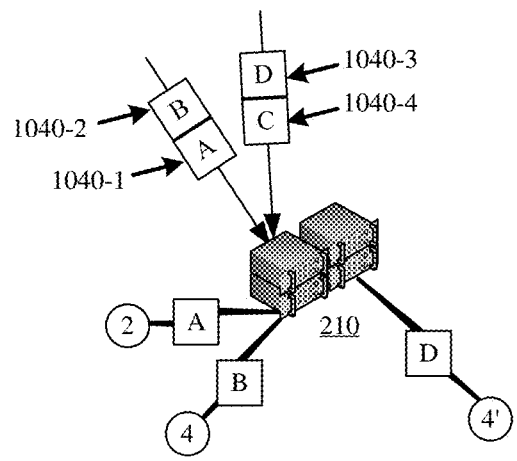
FIG. 10 illustrates another example by which the robots operating in a common site coordinate their operations to coalesce the results and/or outputs from the partitioned execution of the tasks in accordance with some embodiments described herein.
Figure 10:
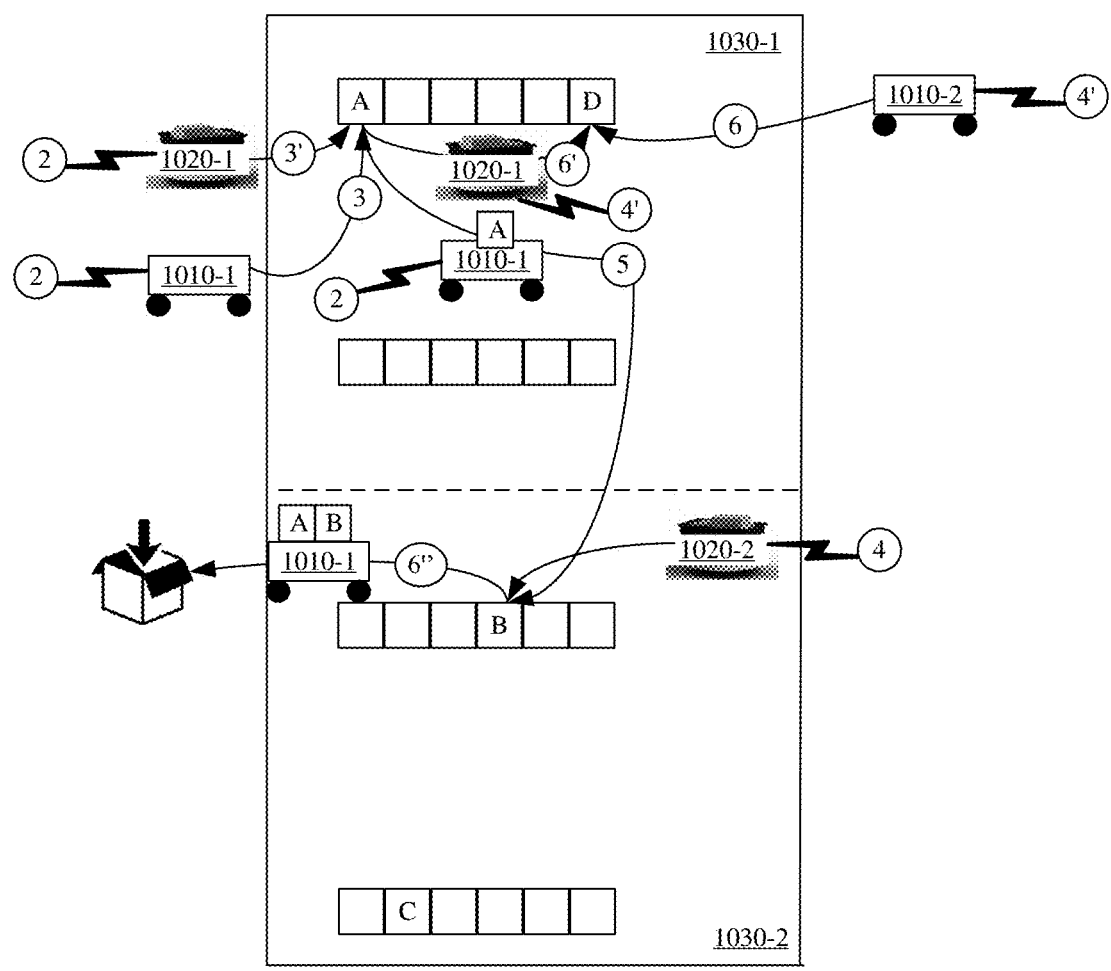

FIG. 10 illustrates another example by which the robots operating in a common site coordinate their operations to coalesce the results and/or outputs from the partitioned execution of the tasks in accordance with some embodiments described herein. In FIG. 10, each transfer robot 1010-1 and 1010-2 may be configured with a storage cart or container or may move a storage rack. Each storage cart or container may be used to coalesce the objects for one or more customer orders that are distributed across the different sections of the site.

As shown in FIG. 10, robot coordinator 210 receives (at 1) different customer orders, maps where objects of the customer orders are located, and assigns tasks (at 2, 4, and 4') to transfer robots 1010 and retrieval robots 1020 to coordinate and synchronize the partitioned retrieval of the objects by retrieval robots 1020 with the coalescing operations performed by transfer robots 1010. For instance, transfer robot 1010-1 meets (at 3) retrieval robot 1020-1 at a storage location in first section 1030-1 where retrieval robot 1020-1 retrieves (at 3') object 1040-1 of a first customer order, and places (at 3') object 1040-1 in the cart of transfer robot 1010-1. Transfer robot 1010-1 then moves with object 1040-1 into second section 1030-2.

Transfer robot 1010-1 meets (at 5) retrieval robot 1020-2 at a storage location in second section 1030-2 where retrieval robot 1020-2 retrieves (at 5') object 1040-2 of the first customer order, and places (at 5') object 1040-2 in the cart of transfer robot 1010-1. Contemporaneously, second transfer robot 1010-2 may meet (at 6) retrieval robot 1020-1 at a storage location in first section 1030-1 where retrieval robot 1020-1 retrieves (at 6') object 1040-3 of a second customer order, and places (at 6') object 1040-3 in the cart of transfer robot 1010-2.

Robot coordinator 210 may coordinate and/or control transfer robots 1010 to coalesce objects of a particular customer order directly from retrieval robots 1020 in order to reduce the distance that each retrieval robot 1020 travels between retrievals. For instance, retrieval robot 1020-1 travels to the first storage location of object 1040-1, retrieves the object 1040-1, and transfers object 1040-1 to transfer robot 1010-1 that is adjacently located. Retrieval robot 1020-1 no longer has to carry object 1040-1 to a storage rack somewhere in first section 1030-1, and can immediately move to the storage location of a next object designated by robot coordinator 210 for retrieval by retrieval robot 1020-1. Robot coordinator 210 may coordinate and/or control transfer robot 1010 to synchronize timing and operations with operations of retrieval robots 1020 executing tasks according to the partitioned execution. Accordingly, robot coordinator 210 may coordinate and control operations of robots 1010 and 1020 in order to prevent robots 1010 and 1020 from colliding or blocking one another, and to maximize the retrieval rate of robots 1010 and 1020.

In FIG. 10, transfer robot 1010-1 may deliver (at 6") objects 1040-1 and 1040-2 of the first customer order that were coalesced from retrieval robots 1020-1 and 1020-1 operating in different sections 1030-1 and 1030-2 to a packing station where the first customer order can be easily, quickly, and correctly readied for shipment to the first customer since all the objects are delivered at one time in one place by transfer robot 1010-1. Similarly, transfer robot 1010-2 may deliver objects 1040-3 and 1040-4 of the second customer order to the same or different packing station once objects 1040-3 and 1040-4 are coalesced from retrieval robots 1020-1 and 1020-2 operating in sections 1030-1 and 1030-2.

Figure 11:
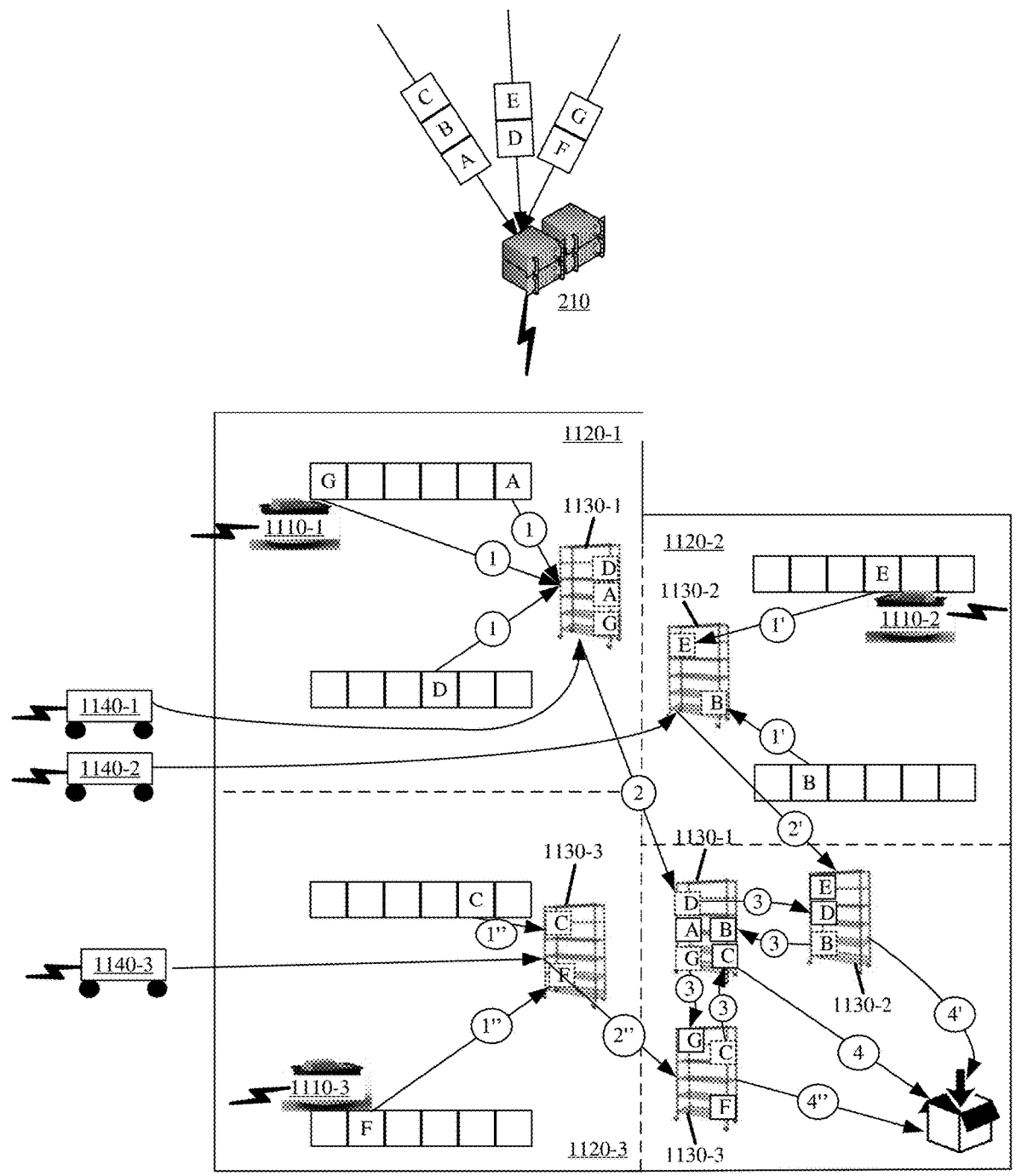
FIG. 11 illustrates an example of multi-stage automated coalescing that is performed by the robots in accordance with some embodiments described herein.

FIG. 11 illustrates an example of multi-stage automated coalescing that is performed by the robots in accordance with some embodiments described herein. In this figure, retrieval robots 1110-1, 1110-2, and 1110-3 operate exclusively within different partitioned sections 1120-1, 1120-2, and 1120-3 of a site. Retrieval robots 1110 retrieve and place (at 1, 1', and 1") objects from different storage locations within their operating section 1120 to a storage rack 1130 located in their operating section 1120 such that movements of retrieval robots 1110 are confined to one operating section 1120.

Once objects for one or more customer orders are retrieved and placed to a storage rack 1130, transfer robots 1140-1, 1140-2, and 1140-3 may perform the multi-stage automated coalescing of the objects from storage racks 1130. For instance, transfer robots 1140 may bring (at 2, 2', and 2") storage racks 1130 from different sections 1120 to a common location in the site. At this time, storage racks 1130 may each store different objects for different customer orders with the collective set of storage racks 1130 storing all the objects for the set of customer orders.

Transfer robots 1140 may then coalesce (at 3) objects for each particular customer order from different storage racks 1130 to one storage rack 1130. For instance, storage rack 1130-1 may arrive at the common location storing one object for each of a first, second, and third customer order, storage rack 1130-2 may arrive at the common location storing one object for each of the first and second customer orders, and storage rack 1130-3 may arrive at the common location storing one object for each of the first and third customer orders. In this figure, the automated coalescing (at 3) may include transfer robot 1140-1 moving the object of the second customer order from storage rack 1130-1 to storage rack 1130-2, and moving the object of the third customer order from storage rack 1130-1 to storage rack 1130-3. Similarly, transfer robot 1140-2 may move the object of the first customer order from storage rack 1130-2 to storage rack 1130-1, and transfer robot 1140-3 may move the object of the first customer order from storage 1130-3 to storage rack 1130-1. Once the coalescing (at 3) operations are complete, each storage rack 1130 will contain all objects for a different customer order. In some embodiments, the coalescing operations may consolidate objects for two or more customer orders on any of storage racks 1130 based on direction from robot coordinator 210. Transfer robots 1140 may then transfer (at 4, 4', and 4") the coalesced storage racks 1130 containing the consolidated objects of one or more customer orders to a packing station where the orders may be packaged, shipped, or otherwise readied in order to complete the overall task of order fulfillment.

Figure 12:
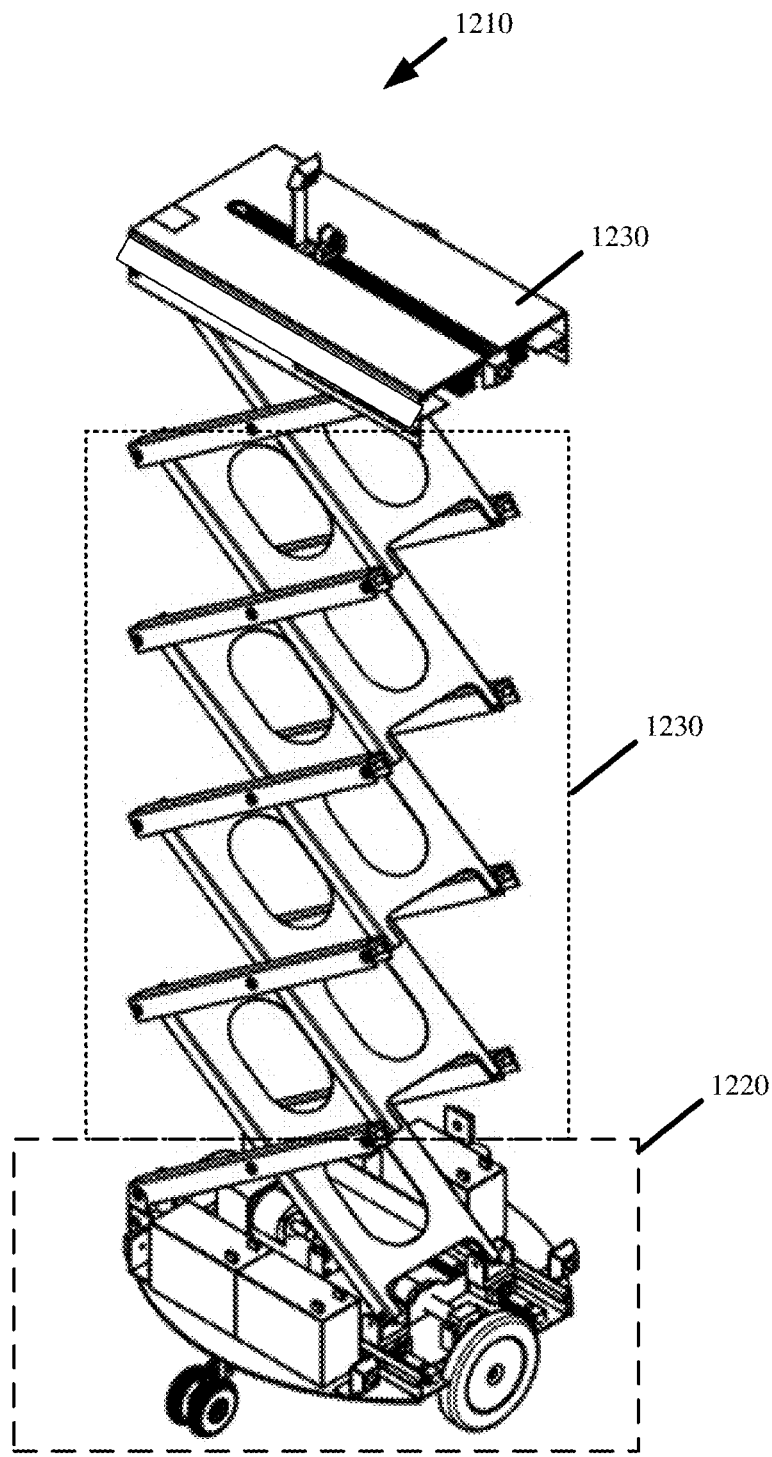
FIG. 12 illustrates an example of a robot for performing the partitioned retrieval and/or coalescing operations in accordance with some embodiments presented herein.

FIG. 12 illustrates an example of robot 1210 for performing the partitioned retrieval and/or coalescing operations in accordance with some embodiments presented herein. In particular, robot 1210 may be an example of a retrieval robot, transfer robot, and/or other robot that is under control of robot coordinator 210 and performs automated and coordinated operations with other robots in a site.

Robot 1210 may include a motorized base 1220 on which one or more motors, batteries, processors, wireless radios, sensors, and wheels are mounted. Motorized base 1220 powers locomotion or movement of robot 1210 in three-dimensional space. In some embodiments, motorized base 1220 may include articulating legs, propellers, tracks, or other means of locomotion besides the illustrated wheels.

Atop motorized base 1220 is lift 1230 that raises and lowers platform 1240. As shown, lift 1230 may include a collapsing and expanding structure. In some embodiments, lift 1230 may include a pneumatic piston or other means for raising and lowering platform 1240.

Platform 1240 may include an elongated surface onto which objects retrieved by robot 1210 may be retained during transport. Platform 1240 may also include a mechanical retriever for retrieving containers and/or other objects onto platform 1240. The mechanical retriever may include at least one motor for moving a retrieval element. The retrieval element may include a vacuum that uses suction to engage containers and/or other objects. The retrieval element may alternatively include a gripper, articulating mechanical arm, or other means to grab or otherwise engage containers and/or objects.

Robot 1210 may use one or more onboard processors to coordinate operations with other robots and/or perform the partitioned retrieval and/or coalescing operations set forth herein. For instance, the processor may activate and control one or more actuators and sensors of robot 1210 to navigate to a storage location of an object, align positioning of robot 1210 for extraction of the object, and provide the object to as transfer robot or storage rack.

Robot 1210 is presented as one example of an autonomous robot that may perform the partitioned retrieval and/or coalescing operations according the methodologies presented herein. Other robot embodiments and the operations performed by the other robot embodiments may similarly be coordinated and controlled by robot coordinator 210 for automated partitioned retrieval and/or coalescing.

Figure 13:
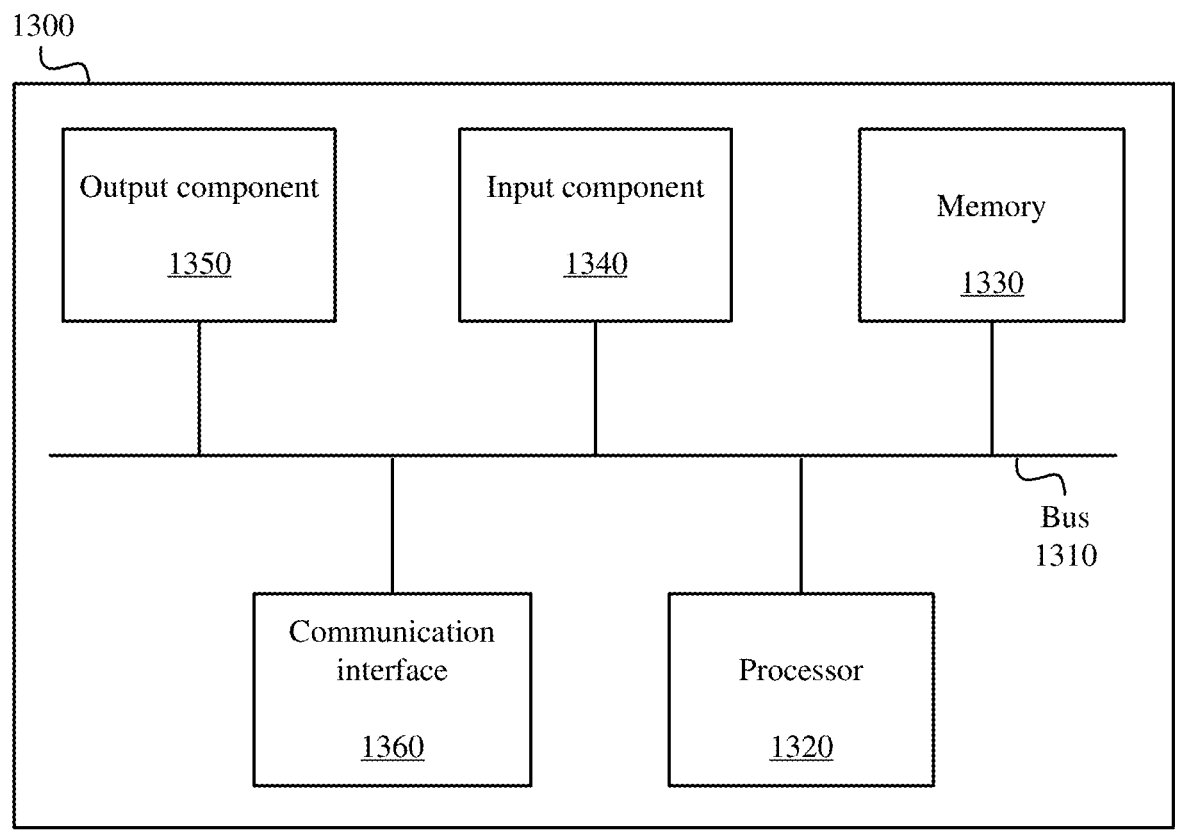
FIG. 13 illustrates example components of one or more devices, according to one or more embodiments described herein.

FIG. 13 is a diagram of example components of device 1300. Device 1300 may be used to implement certain of the devices described above (e.g., robot coordinator 210). Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:

operating a plurality of retrieval robots in a site storing a plurality of objects at different storage locations within the site;

receiving a set of customer orders, each customer order of the set of customer orders comprising a different set of the plurality of objects;

partitioning the site into a plurality of unequal sized sections based on an unequal distribution across the site of objects ordered as part of the set of customer orders, wherein said partitioning comprises providing a different retrieval robot of the plurality of retrieval robots exclusive access to a different unequal sized section of the site and restricting each retrieval robot from accessing other unequal sized sections of the site;

retrieving objects for a first customer order that are stored at storage locations within a first section of the site to a first moveable storage apparatus in the first section with a first retrieval robot of the plurality of retrieval robots while simultaneously retrieving objects for a different second customer order that are stored at storage locations within a non-overlapping and distinct second section of the site to a second moveable storage apparatus in the second section with a second retrieval robot of the plurality of retrieval robots;

determining that the first retrieval robot has transferred the objects of the first customer order located in the first section to the first moveable storage apparatus, and that the second retrieval robot has retrieved the objects of the second customer order located in the second section to the second moveable storage apparatus;

rotating the first moveable storage apparatus from the first section to the second section, and the second moveable storage apparatus from the second section to the first section with at least one transfer robot in response to said determining;

coalescing objects of the first customer order that are stored at storage locations within the second section to the first moveable storage apparatus using the second retrieval robot in response to said rotating of the first moveable storage apparatus with other objects of the first customer order from the first section into the second section; and coalescing objects of the second customer order that are stored at storage locations within the first section to the second moveable storage apparatus using the first retrieval robot in response to said rotating of the second moveable storage apparatus with other objects of the second customer order from the second section into the first section.

2. The method of claim 1, wherein said retrieving comprises retrieving, at a first time, the objects of the first customer order stored at storage locations within the first section of the site with the first retrieval robot.

3. The method of claim 2, wherein said coalescing the objects of the first customer order comprises retrieving, at a later second time with the first movable storage apparatus at the second section, the objects of the first customer order stored at storage locations within the second section of the site with the second retrieval robot.

4. The method of claim 1, wherein said retrieving comprises fulfilling a first part of the first customer order found in the first section with the first retrieval robot when the first movable storage apparatus is at the first section during a first time, and wherein said coalescing the objects of the first customer order comprises fulfilling another part of the first customer order found in the second section with the second retrieval robot when the second movable storage apparatus is at the second section during a later second time.

5. The method of claim 1 further comprising receiving the set of customer orders at a robot coordinator, and mapping, in response to said receiving, each object from the set of customer orders to a different storage location within the site.

6. The method of claim 5, wherein said partitioning comprises defining a size and shape of the first section to include storage locations for a first set of objects from the set of customer orders, and a size and shape of the second section to include storage locations for a second set of objects from the set of customer orders based on said mapping and the first set objects being of about equal size to the second set of objects.

7. The method of claim 6 further comprising providing the first retrieval robot with exclusive access to the first section based on assigning, by the robot coordinator, operations for retrieval of the first set of objects to the first retrieval robot, and providing the second retrieval robot with exclusive access to the second section based on assigning, by the robot coordinator, operations for retrieval of the second set of objects to the second retrieval robot.

8. The method of claim 5 further comprising coordinating simultaneous operation of the first retrieval robot in the first section and the second retrieval robot in the second section via a robot coordinator.

9. The method of claim 8, wherein said coordinating comprises assigning from the robot coordinator to the first retrieval robot a first set of tasks involving retrieval of the objects of the first customer order that are stored at the storage locations within the first section of the site at the same time as assigning from the robot coordinator to the second retrieval robot a second set of tasks involving retrieval of the objects of the second customer order that are stored at the storage locations within the second section of the site.

10. The method of claim 8, wherein said coordinating comprises assigning from the robot coordinator to the first retrieval robot a first set of tasks involving retrieval of the objects of the first customer order that are stored at the storage locations within the first section of the site at a first time and retrieval of the objects of the second customer order that are stored at the storage locations within the first section of the site at a later second time commencing after said rotating, and assigning from the robot coordinator to the second retrieval robot a second set of tasks involving retrieval of the objects of the first customer order that are stored at the storage locations within the second section of the site at the second time and retrieval of the objects of the second customer order that are stored at the storage locations within the first section of the site at the first time.

11. The method of claim 1 further comprising providing first messaging from the first robot to a robot coordinator in response to completed transfer of the objects of the first customer order in the first section to the first moveable storage apparatus, providing second messaging from the second robot to the robot coordinator in response to completed transfer of the objects of the second customer order in the second section to the second moveable storage apparatus, and assigning from the robot coordinator to the at least one transfer robot a first coalescing task involving transfer of the first moveable storage apparatus from the first section to the second section, and a second coalescing task involving transfer of the second moveable storage apparatus from the second section to the first section in response to receiving the first messaging and the second messaging.

12. A system comprising:
a first retrieval robot operating within a first section of a site;
a second retrieval robot operating within a different second section of the site that does not overlap with the first section of the site;
at least one transfer robot operating across at least the first and second sections of the site;
a first moveable storage apparatus;
a second moveable storage apparatus; and
a robot coordinator comprising:
one or more processors configured to:
receive a set of customer orders, each customer order of the set of customer orders comprising a different set of a plurality of objects at different storage locations within the site;
partition the site into at least the first and second sections of unequal sizes based on an unequal distribution across the site of objects ordered as part of the set of customer orders, wherein said partitioning comprises providing the first retrieval robot exclusive access to the first section of the site, providing the second retrieval robot exclusive access to the second section of the site, and restricting the first and second retrieval robots from accessing other unequal sized sections of the site;
coordinate transfer of objects for a first customer order that are stored at storage locations within the first section to the first moveable storage apparatus in the first section using the first retrieval robot, and transfer of objects for a second customer order that are stored at storage locations within the second section to the second moveable storage apparatus in the second section using the second retrieval robot;
determine that the first retrieval robot has transferred the objects of the first customer order located in the first section to the first moveable storage apparatus, and that the second retrieval robot has retrieved the objects of the second customer order located in the second section to the second moveable storage apparatus;
direct the at least one transfer robot in rotating the first moveable storage apparatus from the first section to the second section, and the second moveable storage apparatus from the second section to the first section in response to said determining;
direct the second retrieval robot in coalescing objects of the first customer order that are stored at storage locations within the second section to the first moveable storage apparatus in response to said rotating of the first moveable storage apparatus with other objects of the first customer order from the first section into the second section; and direct the first retrieval robot in coalescing objects of the second customer order that are stored at storage locations within the first section to the second moveable storage apparatus in response to said rotating of the second moveable storage apparatus with other objects of the second customer order from the second section into the first section.

13. The system of claim 12, wherein the one or more processors are further configured to detect completion of said transfer of the objects of the first customer order located in the first section to the first moveable storage apparatus by the first retrieval robot based on messaging provided by the first retrieval robot to the robot coordinator, and the objects of the second customer order located in the second section to the second by the second retrieval robot based on messaging provided by the second retrieval robot to the robot coordinator.

14. The system of claim 13, wherein directing the second retrieval robot comprises programming the second retrieval robot in transferring the objects of the first customer order that are stored at storage locations within the second section to the first moveable storage apparatus after the at least one transfer robot rotates the first moveable storage apparatus from the first section to the second section.

* * * * *